(12) United States Patent
Oberdorfer et al.

(10) Patent No.: US 11,971,075 B1
(45) Date of Patent: Apr. 30, 2024

(54) SINGLE AIR DISC BRAKE TAPPET WITH FEATURES THAT MIMIC MULTIPLE TAPPETS

(71) Applicant: Bendix Commercial Vehicle Systems LLC, Avon, OH (US)

(72) Inventors: Erik W. Oberdorfer, Akron, OH (US); Brian Kondas, Brecksville, OH (US); Eugene Clair, Berea, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 18/213,447

(22) Filed: Jun. 23, 2023

(51) Int. Cl.
*F16D 65/095* (2006.01)

(52) U.S. Cl.
CPC .................. *F16D 65/095* (2013.01)

(58) Field of Classification Search
CPC ...... F16D 65/095; F16D 65/04; F16D 65/067; F16D 65/09
See application file for complete search history.

(56) References Cited

U.S. PATENT DOCUMENTS

| | | | |
|---|---|---|---|
| 3,422,935 A | 1/1969 | House | |
| 3,708,043 A | 1/1973 | Rath et al. | |
| 4,289,216 A | 9/1981 | Shirai et al. | |
| 4,533,025 A | 8/1985 | Carré | |
| 5,022,500 A | 6/1991 | Wang | |
| 5,074,578 A | 12/1991 | Grove et al. | |
| 8,936,138 B2 | 1/2015 | Morris et al. | |
| 9,358,961 B2 | 6/2016 | Pahle | |
| 10,316,916 B2 | 6/2019 | Fischl | |
| 10,746,242 B2 | 8/2020 | Shah et al. | |
| 10,801,569 B2 | 10/2020 | Mcginn et al. | |
| 10,851,857 B2 | 12/2020 | Baumgartner | |
| 11,230,275 B2 * | 1/2022 | Smith | B62D 5/046 |
| 2006/0289251 A1 | 12/2006 | Demorais et al. | |

(Continued)

FOREIGN PATENT DOCUMENTS

DE  10 2007 023 191 B4  12/2008
DE  10 2021 120 048 A1  2/2023

(Continued)

OTHER PUBLICATIONS

Calipers—Wabco—PAN™ 17 Air Disc Brake, 6 15/16"; Meritor Part No. 640 175 940 2; PB-146; MeritorPartsXpress.com; August 2022; 2 pages.

(Continued)

*Primary Examiner* — Pamela Rodriguez
(74) *Attorney, Agent, or Firm* — Crowell & Moring LLP

(57) ABSTRACT

The following embodiments relate to a single air disc brake tappet with features that mimic multiple tappets. In one embodiment, an air disc brake tappet is provided comprising: a support member; and a plate coupled with support member, wherein the plate comprises a plurality of raised features that mimic a plurality of air disc brake tappets. In another embodiment, an air disc brake pad assembly is provided comprising: a friction material; and a backing plate coupled with the friction material, wherein the backing plate comprises at least one recess shaped and positioned to receive a plurality of raised features of an air disc brake tappet, wherein the plurality of raised features mimics a plurality of air disc brake tappets. Other embodiments are provided.

17 Claims, 26 Drawing Sheets

(56) References Cited

U.S. PATENT DOCUMENTS

2007/0209891 A1    9/2007   Stensson et al.
2015/0285321 A1   10/2015   Maehara et al.
2017/0074338 A1    3/2017   Fischi

FOREIGN PATENT DOCUMENTS

| DE | 10 2022 107 615 A1 | 10/2023 |
|----|--------------------|---------|
| KR | 10-0572631 B1 | 9/2005 |
| KR | 10-2021-0085405 A | 7/2021 |
| WO | WO 1999/05428 A1 | 2/1999 |
| WO | WO 2011/042280 A1 | 4/2011 |
| WO | WO 2022/139703 A2 | 6/2022 |

OTHER PUBLICATIONS 640-225-926-2 Air Disc Brake—Pressure Plate Kit; Meritor Parts Xpress web page; prior to Jun. 2023; 1 page.
"Bendix® ADB22X®, ADB22®-V & ADB22X®- LT Air Disc Brakes"; Service Data Sheet SD-23-7541; Bendix Commercial Vehicle Systems LLC; Aug. 2021; 48 pages.
"Meritor® EX+™ LS Air Disc Brakes"; product brochure; Meritor Heavy Vehicle Systems, LLC; Oct. 2019; 2 pages.
"Wabco MAXXUS"; two color images; prior to Jun. 2023; 2 pages.
"Meritor Single Piston"; two color images; prior to Jun. 2023; 1 page.
"Wabco MAXUS 2.0"; three color images; prior to Jun. 2023; 2 pages.
ECO Disc TSB Caliper; Workshop Service Sheet, version 3; BPW Limited; Dec. 2021; one page.

\* cited by examiner

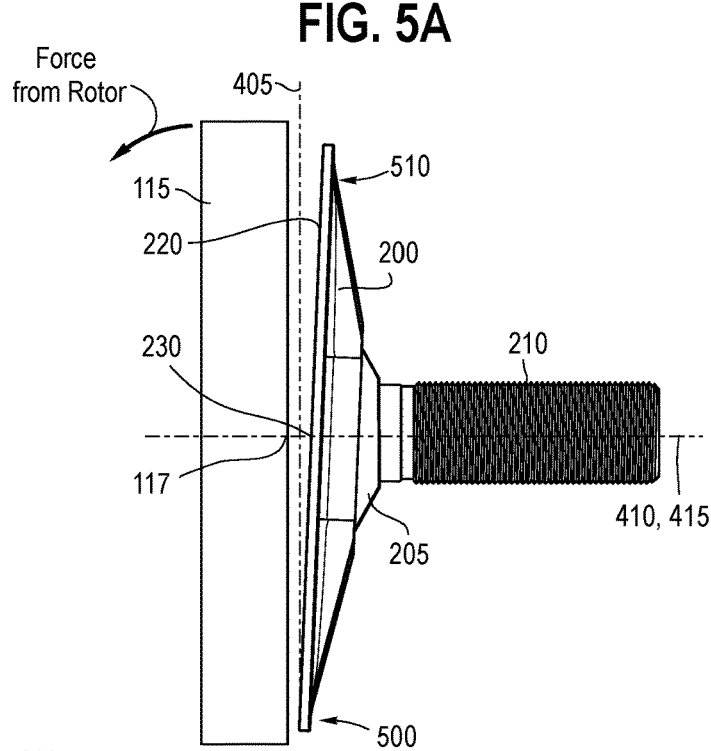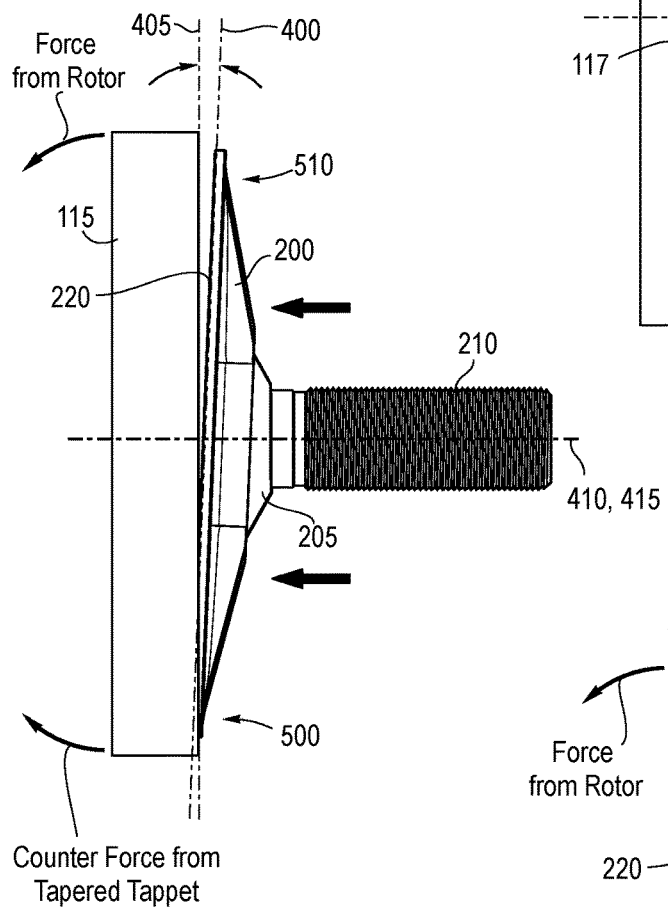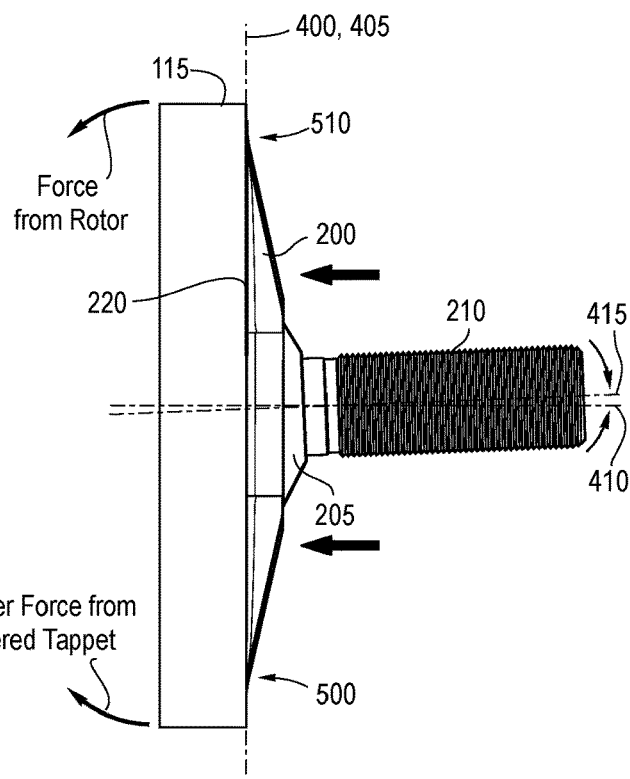

SINGLE AIR DISC BRAKE TAPPET WITH FEATURES THAT MIMIC MULTIPLE TAPPETS

BACKGROUND

In some air disc brake systems, when the brakes are applied, air pushes two spaced-apart tappets against a backing plate of an inner brake pad, which moves the inner brake pad in contact with a rotor coupled with a wheel. In other air disc brake systems, a single tappet is used that is positioned to contact the middle of the backing plate. During braking, the rotor rotates, and the brake pad is applied against it to create a braking force. A resulting unequal force distribution caused by the moment created between the brake pad drag force and abutment force can lead to uneven distribution of the braking force and, hence, uneven wear of the inner brake pad. Various solutions have been proposed to address this problem.

BRIEF DESCRIPTION OF THE DRAWINGS

FIG. 5A is an illustration of a tappet and a brake pad backing plate of an embodiment prior to contact.

FIG. 513 is an illustration of a tappet and a brake pad backing plate of an embodiment at initial contact.

FIG. 5C is an illustration of a tappet and a brake pad backing plate of an embodiment in full contact.

FIG. 81) is a side view of a tappet of an embodiment having with a recess and a non-tapered top surface.

FIG. 101) is an illustration of a brake pad backing plate of an embodiment being installed into a braking system.

FIG. 1713 is an illustration of a brake pad backing plate and a tappet of an embodiment that has features that mimic multiple tappets.

SUMMARY

The following embodiments relate to a single air disc brake tappet with features that mimic multiple tappets. In one embodiment, an air disc brake tappet is provided comprising: a support member; and a plate coupled with support member, wherein the plate comprises a plurality of raised features that mimic a plurality of air disc brake tappets.

In another embodiment, an air disc brake pad is provided comprising: a friction material; and a backing plate coupled with the friction material, wherein the backing plate comprises at least one recess shaped and positioned to receive a plurality of raised features of an air disc brake tappet, wherein the plurality of raised features mimics a plurality of air disc brake tappets.

In yet another embodiment, an air disc brake system is provided comprising an air disc brake pad and an air disc brake tappet. The air disc brake pad comprises: a friction material; and a backing plate coupled with the friction material, wherein the backing plate comprises at least one recess. The air disc brake tappet comprises: a support member; and a plate coupled with support member, wherein the plate comprises a plurality of raised features that mimic a plurality of air disc brake tappets, wherein the plurality of raised features are shaped and positioned to mate with the at least one recess of the backing plate.

Other embodiments are possible, and each of the embodiments can be used alone or together in combination.

DETAILED DESCRIPTION

General Overview of an Air Disc Brake System

Figure 1A:
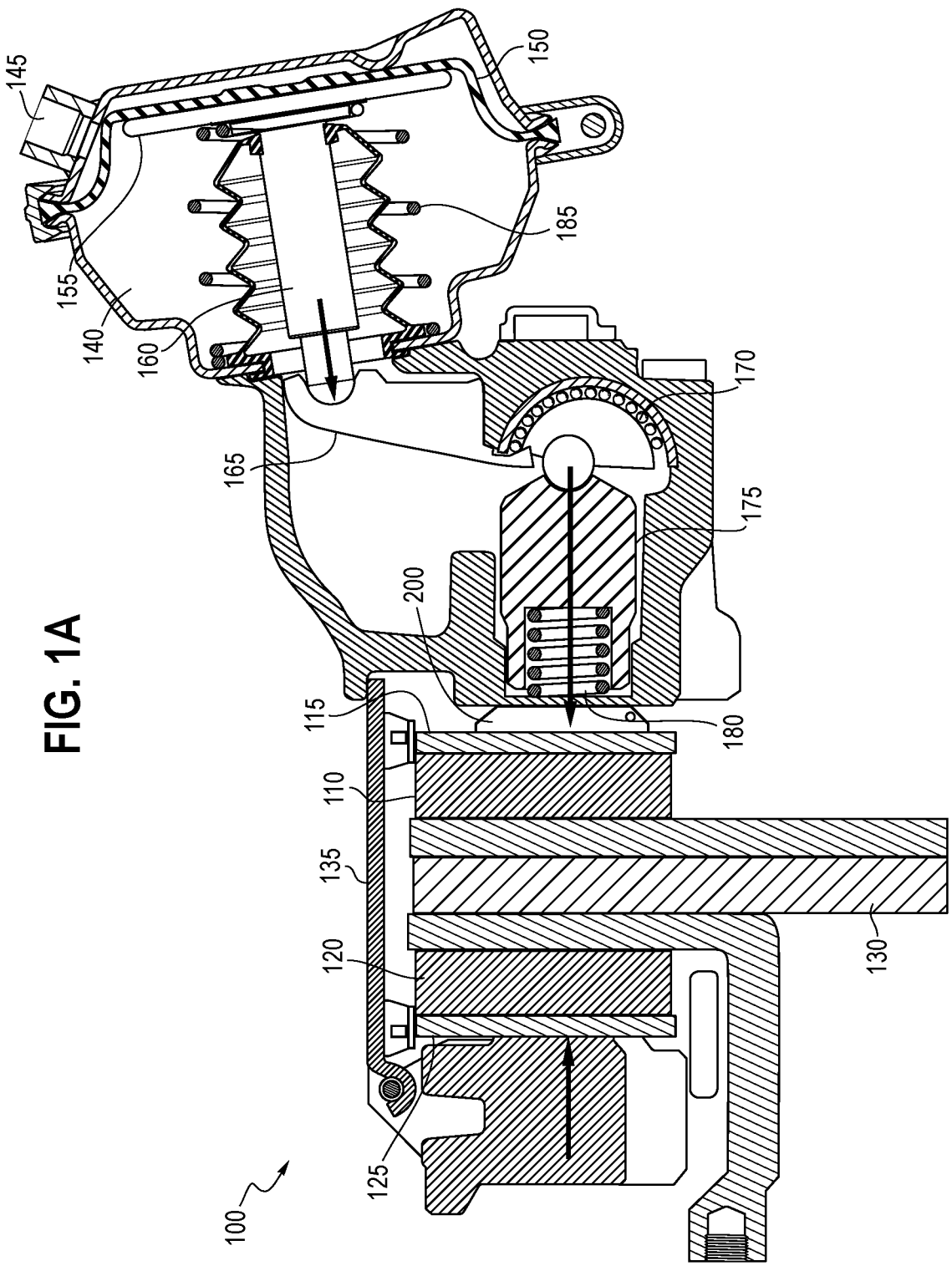
FIG. 1A is an illustration of an air disc brake system an embodiment.

Turning now to the drawings, FIG. 1A is an illustration of an air disc brake system 100 of an embodiment. As shown in FIG. 1A, this system 100 comprises an inner brake pad 110 and an outer brake pad 120 in proximity to a brake rotor 130 coupled with a wheel of a vehicle. Each brake pad 110, 120 comprises a friction material (e.g., a mixture of different particles of material) configured to slow the rotation of the rotor 130 when the brake pads 110, 120 press against the rotor. Each brake pad 110, 120 is bonded to a respective backing plate 115, 125, which can be made from cast iron or steel, for example. A floating caliper 135 couples the two brake pads 110, 120.

In operation, when the vehicle brakes are applied (e.g., when a driver presses a brake pedal or an automated driving system generates an electronic signal to apply the brakes), air enters a service brake chamber 140 through a supply port 145, applying pressure within a diaphragm 150. The pressure expands the diaphragm 150, thereby applying force to and moving a pressure plate 155 and a pushrod 160 forward. The pushrod 160 acts against a cup in an internal lever 165, which pivots on an eccentric bearing 170 to move a bridge 175. Moving against a return spring 180, the bridge 175 transfers the motion to a support memory (e.g., a threaded tube, which is not shown) and a tappet 200, which contacts the inner brake pad's backing plate 115 to move the inner brake pad 110 into contact with the rotor 130. Further movement of the bridge 175 forces the floating caliper 135 (sliding on two stationary guide pins (not shown)) away from the rotor 130. That, in turn, pulls the outer brake pad 120 into the rotor 130. The clamping action of the brake pads 110, 120 on the rotor 130 applies braking force to the wheel. When the vehicle brakes are released, the air pressure in the service brake chamber 140 is exhausted, and the return spring 180 in the bridge 175 and a return spring 185 in the service brake chamber 140 return the air disc brake to a neutral, non-braked position. It should be understood that this is merely an example and that other configurations can be used.

As noted above, when the brakes are applied, air forces the tappet 200 (coupled with a support, such as a threaded tube) into contact with the inner brake pad's backing plate 115. The combination of the tappet 200 and threaded tube may sometime be referred to herein a plunger or piston, and the tappet 200 may sometimes be referred to herein as a pressure plate. In a two-tappet braking system, a pair of spaced-apart tappets (and threaded tubes) are used to distribute the applied force over a large area of the backing plate 115. This results in a relatively-equalized distribution of the braking force on the backing plate 115 and, hence, the rotor 130, which results in relatively-even wear of the inner brake pad 110.

The brake pads 110, 120 and rotor 130 wear away every time the brakes are applied. Over time, this increases the running clearance between the brake pads and rotor and also the tappets and the backing plate 115. The braking system 100 can have a mechanical mechanism (not shown) for each of the two tappets to adjust the relative position of each tappet to compensate for the increased running clearance. To reduce cost and complexity (especially in vehicles that do not need the robustness of a two-tappet brake), a single tappet can be used, as using just a single tappet would eliminate half of the components in the mechanical mechanism that compensates for the increased running clearance.

Unlike a two-tappet brake which distributes braking force over left- and right-sides of the backing plate 115, the tappet in a single-tappet brake is typically positioned in the center of the backing plate 115. So, as compared to using a two-tappet brake, using a single-tappet brake can result in an uneven distribution of braking force and, hence, uneven wear of the inner brake pad 110. It should be mentioned that a two-tappet brake does not eliminate tapered pad wear, but it is a common method of reducing the phenomenon as it helps to more-evenly distribute the braking force. One other note is that another common method to reduce tapered wear is to use many tappets or pistons and sometimes vary the size of them with respect to the leading and trailing ends of the pads to help mitigate tapered pad wear. More specifically, as the rotor 130 rotates, the leading edge of the inner brake pad 110 can wear more quickly due to the unequal force distribution caused by the moment created between the brake pad drag force and abutment force. These forces will be discussed in reference to FIG. 1B.

Figure 1B:
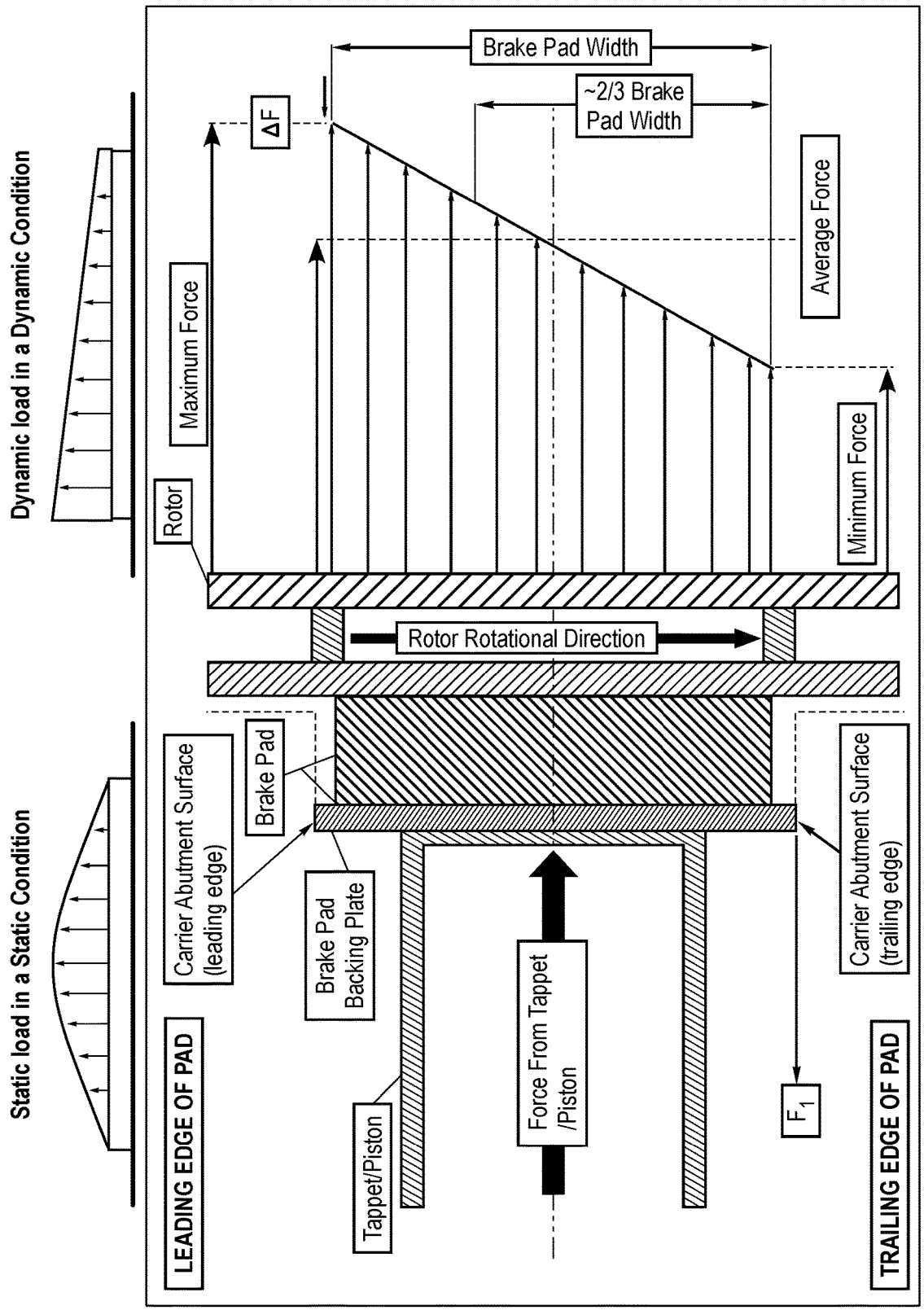
FIG. 1B is an illustration of longitudinal tapered wear forces on an air disc brake system of an embodiment.

As shown in FIG. 1B, pressure distributed on the inboard brake pad can be referred to in two ways. The first way is static load in a static condition. In the static condition, the force distribution has a parabolic shape as seen in the diagram in the left-hand side of FIG. 1B. The second way is dynamic load in a dynamic condition. Here, the forces output onto the pad are mostly at a right-angled triangular shape, where the larger amount of pressure is at the leading edge. In the dynamic condition, the unequal force distribution is caused by the moment created between the brake pad drag force and the carrier abutment force as shown in the right-hand side of FIG. 1B. The maximum force at the leading edge of the brake pad is greater than the force at the trailing edge. Here, the force at the trailing edge is referred to as the minimum force. In general, the force at the leading edge might be approximately one-third greater than the average pressure. In general, the force at the trailing edge might be approximately two-thirds of the average pad pressure. This imbalance of pressure in the dynamic condition can cause each edge of the brake pad to move and/or wear differing distances upon brake application, hence, leading to tapered pad wear.

Various solutions have been proposed to address this problem, but these solutions are often complex and costly. The following embodiments provide different solutions to this problem. It should be understood that these embodiments can be used alone or in combination with one another.

Examples of Tapered Tappets for Brake Pad Wear Reduction

In one embodiment, a tapered tappet is used in a single piston system (although tapered tappets can also be used in multi-piston systems or, as will be discussed below, in a single piston system with features that mimic multiple tappets) to provide more-even distribution of brake force and brake pad wear. More specifically, in one embodiment, the tappet 200 is tilted/contoured (e.g., at a one-degree angle) with respect to the backing plate 115, such that one end of the tappet 200 contacts the trailing edge of the backing plate 115 before the other end of the tappet 200 contacts the leading edge of the backing plate 115. This extra force on the trailing edge of the backing plate 115 can partially or completely offset the force on the leading edge of the backing plate 115 created by the rotor 130, thereby potentially avoiding the uneven distribution of the braking force and, hence, the uneven wear of the inner brake pad 110. This and other features will be discussed in more detail below.

Figure 2A:
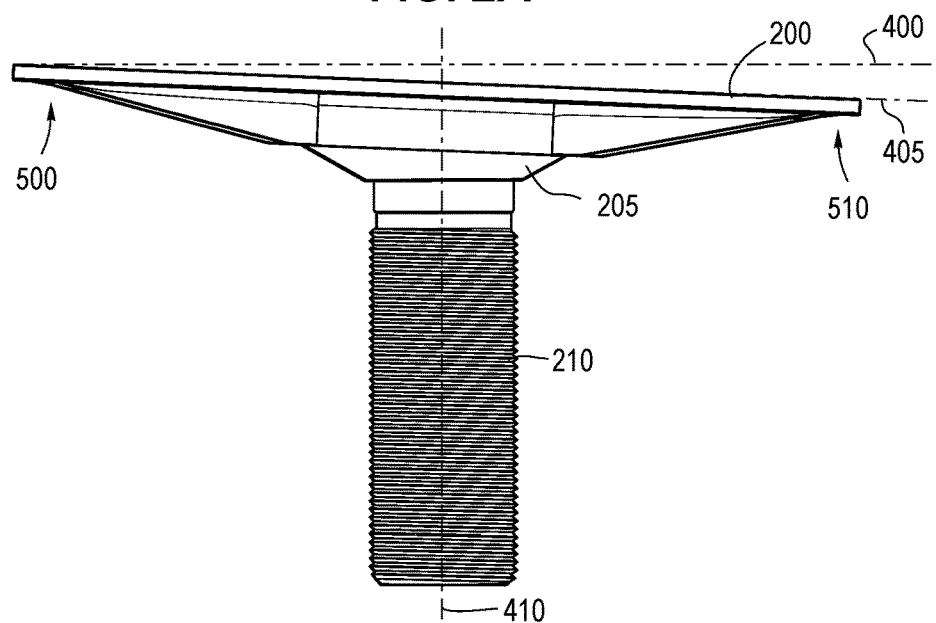
FIG. 2A is a side view of a tappet of an embodiment.
Figure 2B:
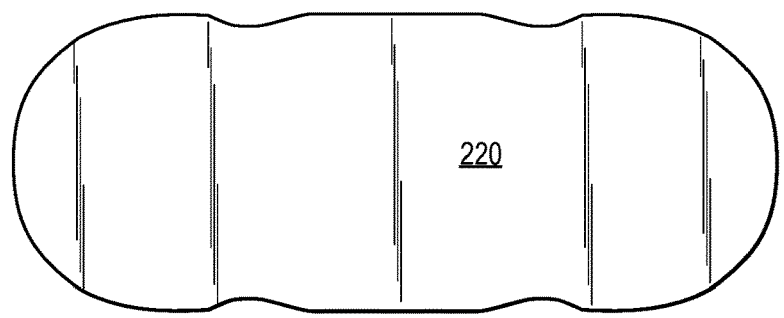
FIG. 2B is a top view of a tappet of an embodiment.
Figure 2C:
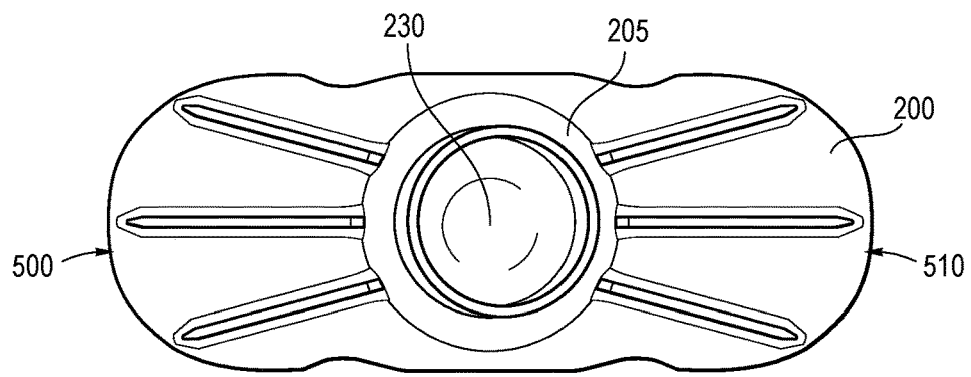
FIG. 2C is a bottom view of a tappet of an embodiment.

Turning again to the drawings, FIGS. 2A, 2B, and 2C are side, top, and bottom views, respectively, of the tappet 200 of this embodiment. The tappet 200 comprises a portion that is configured to couple the tappet 200 with a support member. For example, FIGS. 2A and 2B show the threaded tube 210 coupled with mating threads in an interior of a coupling member 205 of the tappet 200. Alternatively, the threaded tube 210 can be coupled to the tappet 200 by crimping a portion of the body of the tappet 200 to the threaded tube 210 with an intermediary bushing (not shown). Other affixation methods are contemplated. (While a threaded tube 210 is shown in this example, it should be understood that other types of support members can be used (e.g., a non-threaded tube, a rod, etc.) FIG. 2C indicates a center 230 of the tappet 200, which as will be discussed below, can be positioned to align with the center 117 of the backing plate 115 (see FIG. 3A). As shown in FIG. 2B, in this embodiment, the top surface 220 of the tappet 200 is flat. In other embodiments, the top surface 220 of the tappet 200 can have raised portions and/or recessed portions that can mate with mating portions on the backing plate 115, as will be discussed below. This would create a unique interface, such that the backing plate 115 would be keyed with a matching tappet 200, and vice versa. As will be discussed in more detail below, the top surface 220 of the tappet 200 in this embodiment is tapered/angled. As such, as shown in FIG. 2C, when the top surface 220 of the tappet 200 rests upon a flat surface, the coupling member 205 is located at a slight angle with respect to that flat surface.

Figure 3A:
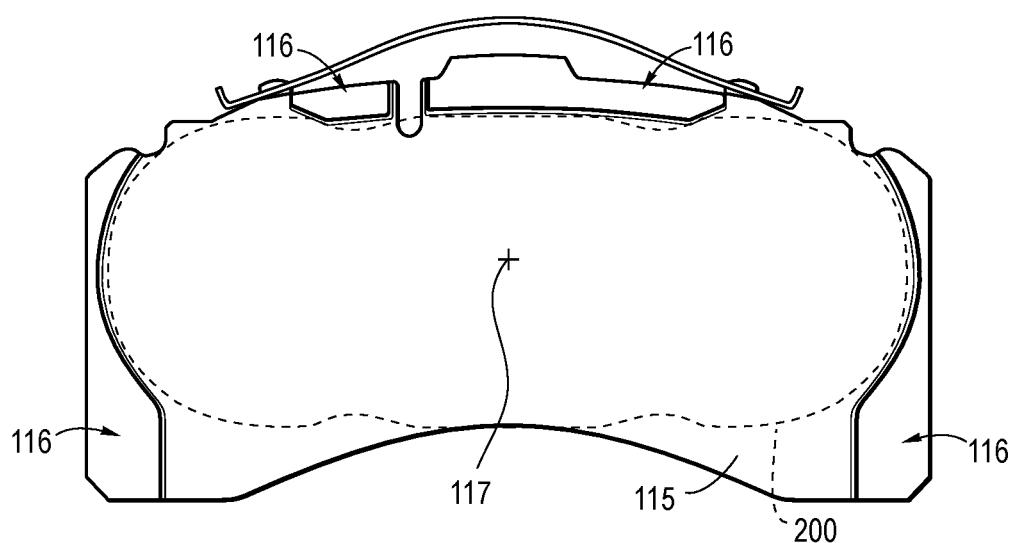
FIG. 3A is an illustration of a brake pad backing plate of an embodiment.
Figure 3B:
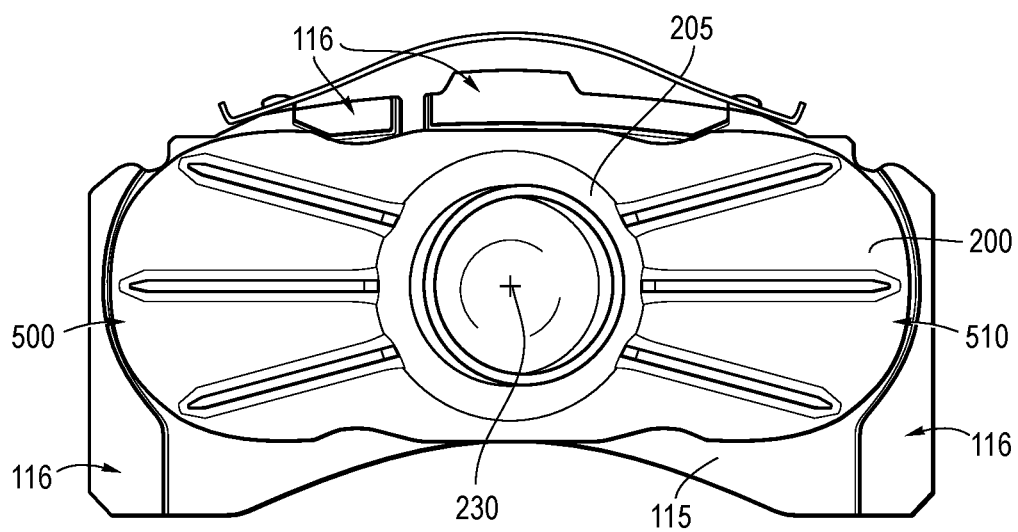
FIG. 3B is an illustration of a tappet pushing against a brake pad backing plate of an embodiment.

FIG. 3A is an illustration of the backing plate 115 of this embodiment. The overall shape of the backing plate 115 shown in FIG. 3A is just an example, and other shapes (some of which are illustrated in other drawings herein) can be used. The side of the backing plate 115 shown in FIG. 3A is the side that contacts the top surface 220 of the tappet 200 (see FIG. 3B), and the opposite site of the backing plate 115 is bonded or otherwise coupled with the inner brake pad 110. As shown in FIG. 3A, the side surface of the backing plate 115 has a recess whose surrounding raised features 116 generally match the overall shape of the top surface 220 of the tappet 200. So, as shown in FIG. 3B, when the tappet 200 is pushed against the backing plate 115, the tappet 200 is received in the recess and generally mates with the backing plate 115. This coupling can help the backing plate 115 resist any rotation caused by the rotor 130 when it makes contact with the inner brake pad 110, as well as key the use of the backing plate 115 and tappet 200 together. As shown in FIGS. 3A and 3B, in this embodiment, the center 230 of the tappet 200 is positioned to generally align with the center 117 of the backing plate 115. In other embodiments, the tappet 200 is positioned such that its center 117 is offset with respect to the center 117 of the backing plate 115. Also, as with FIG. 2C, FIG. 3B shows that the coupling member 205 is located at a slight angle with respect to the flat surface of the backing plate 115 because of the tapered/angled nature of the top surface 220 of the tappet 200 in this embodiment.

Figure 4A:
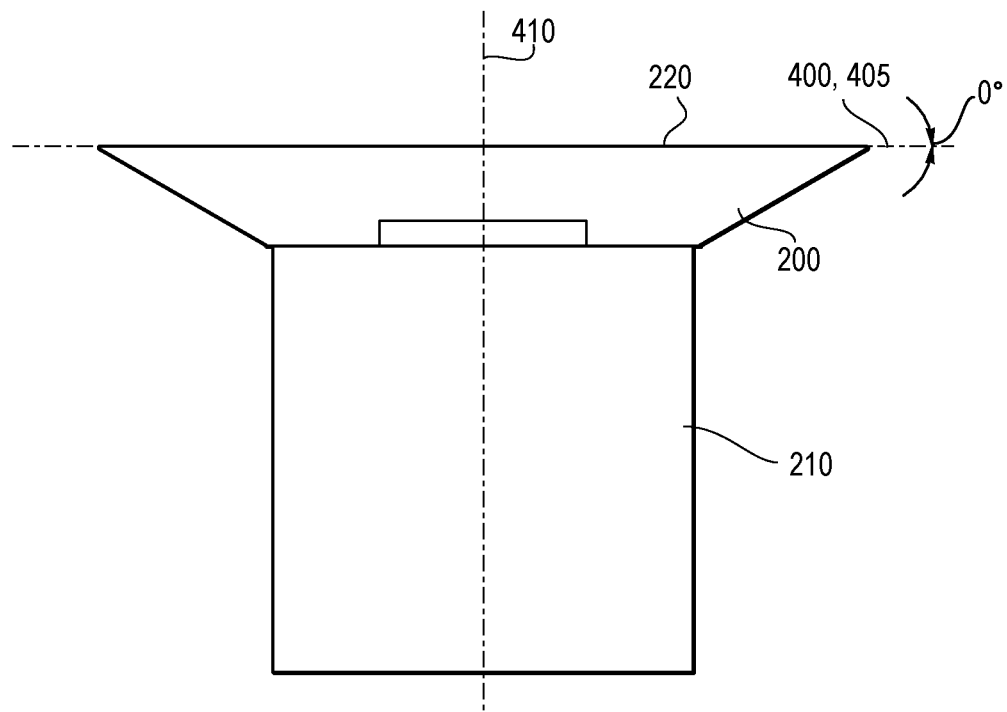
FIG. 4A is an illustration of a tappet of an embodiment with a zero-degree tilt.
Figure 4B:
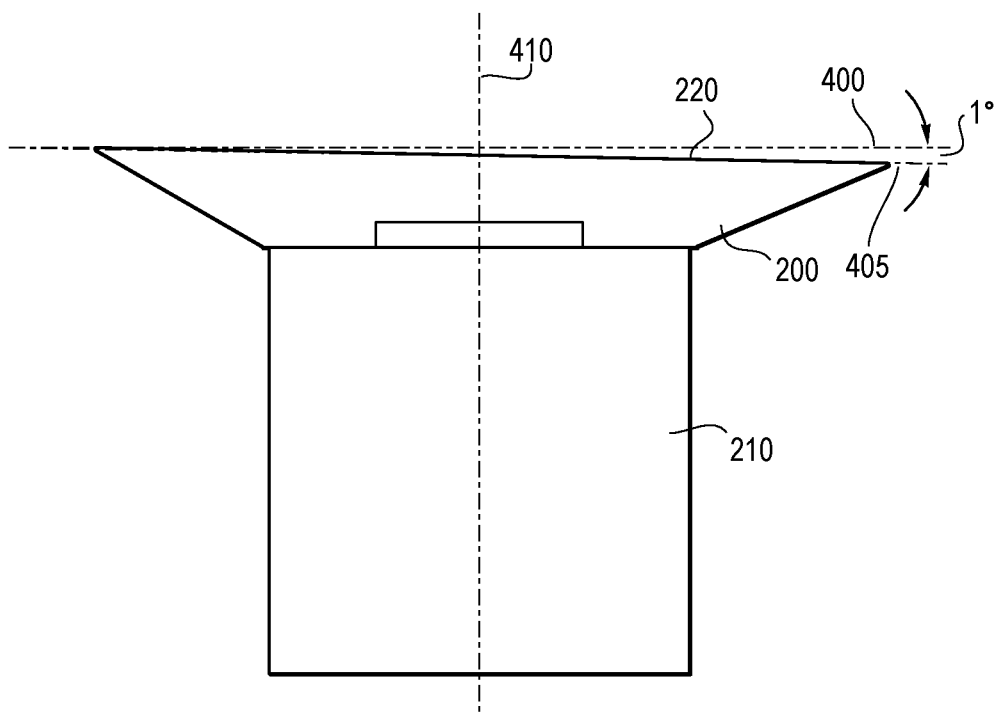
FIG. 4B is an illustration of a tappet of an embodiment with a one-degree tilt.

Turning now to FIG. 4A, in a non-tapered-tappet design, the axis 400 that is perpendicular to the axis 410 running through the center 230 of the tappet 200 is co-linear with the axis 405 defined by the top surface 220 of the tappet 200. In contrast, as shown in FIG. 4B, in the tapered-tappet design, the tappet 200 is machined such that the top surface 220 of the tappet 200 is angled with respect to the perpendicular axis 400. (Instead of being machined, a separate tapered piece can be secured to an existing flat-surface tappet.) In FIG. 4B, that angle is one degree (exaggerated in FIG. 4B to bring attention to the tilt). One degree of taper may be able to offset two millimeters for wear, for example. However, it is important to note that any suitable angle can be used. Also, the degree of the angle can be a function of the friction material used for the inner brake pad 110. For example, a relatively-large angle might be used for a relatively-more-forgiving friction material.

As noted above, since the backing plate 115 is positioned generally parallel to the axis 400, the top surface 220 of the tappet 200 is also titled with respect to the backing plate 115. The tapered tappet 200 (see FIG. 4A) can be used to bias the force that the tappet 200 presents to the backing plate 115 toward one side, which can partially or completely offset the unequal force distribution caused by the moment created between the brake pad drag force and abutment force that can lead to an uneven distribution of the braking force and uneven wear of the brake pad 110. This is illustrated in FIGS. 5A-5C.

FIG. 5A shows the tappet 200 prior to contact with the backing plate 115. As shown in FIG. 5A, the tappet 200 is angled downward with respect to a perpendicular to the axis 410 running through the center 230 of the tappet 200, as well as the axis 415 running through the center of the threaded tube 210. This results in one end 500 of the tappet 200 being closer to the backing plate 115 than the other end 510 of the tappet 200. As such, when the tappet 200 is pushed into the backing plate 115, the protruding end 500 of the tappet 200 (but not the other end 510) makes initial contact with the backing plate 115 (see FIG. 5B).

As the tappet 200 is continued to be pushed into the backing plate 115, the entire full front surface 220 of the tappet 200 comes into contact with the backing plate 115 (see FIG. 5C). So, both the protruding end 500 and the other end 510 of the tappet 200 push against the backing plate 115. However, as noted above, because of the tilt in the top surface 220 of the tappet 200, the threaded tube 210 becomes slightly angled, so there is a slight angle between the axis 410 running through the center 230 of the tappet 200 and the axis 415 running through the center of the threaded tube 210. So, instead of the tappet 200 providing a normal force to the center 117 of the backing plate 115, the protruding end 500 of the tappet 200 creates a biasing force on the trailing edge of the backing plate 115. That is, even though the center 230 of the tappet 200 is aligned with the center 117 of the backing plate 115, the center of pressure is biased away from the center 117 of the backing plate 115 toward the trailing edge of the backing plate 115 without moving the relative location of the center 230 of the tappet 200 toward the trailing edge of the backing plate 115. This off-center force on the trailing edge of the backing plate 115 can partially or completely compensate for the force on the leading edge of the backing plate 115 created by the unequal force distribution caused by the moment created between the brake pad drag force and abutment force. This can avoid the problem noted above of uneven distribution of the braking force and, hence, uneven wear of the inner brake pad 110.

Also, as noted above, the top surface 220 of the tappet 200 generally mates with the matching profile/recess formed in the backing plate 115. This helps the backing plate 115 resist rotating due to the rotational forces being applied by the rotor 130. This also provides a unique interface, such that the backing plate 115 would be keyed with a matching tappet 200, and vice versa. As will be discussed below, other keyed shapes can be used. Further, the top surface 220 of the tappet 200 is generally elongated and covers a relatively-large area of the backing plate 115 in this embodiment, which can help distribute the braking force on the backing plate 115 to further assist in providing even distribution of the braking force and, hence, more even wear of the brake pad. It should be noted that the elongated shape of the tappet 200 shown in the above-referenced figures is merely an example and other shapes can be used, some of which are described below.

Figure 6A:
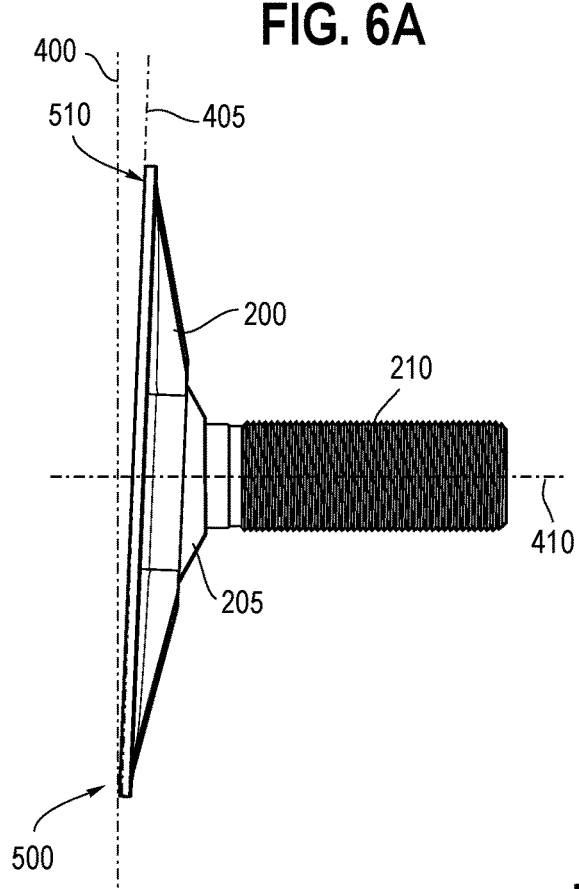
FIG. 6A is a side view of a tappet of an embodiment.
Figure 6B:
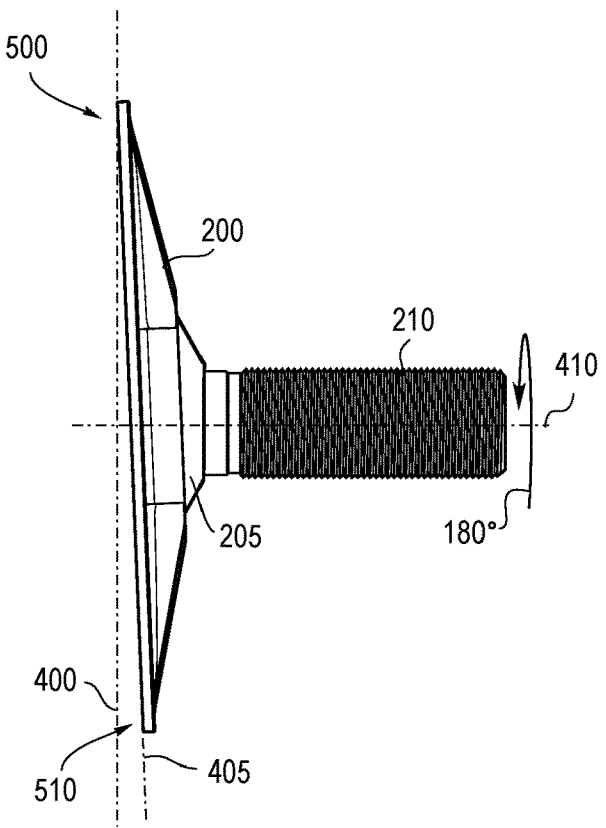
FIG. 6B is a side view of the tappet in FIG. 6A rotated 180 degrees.

Also, in this embodiment, the overall shape of the top surface 220 of the tappet 200 is symmetrical. As shown in FIGS. 6A and 6B, this means that a 180-degree rotation of the tappet 200 moves the position of the protruding end 500 of the tappet 200 180 degrees. This allows the tappet 200 to be used on backing plates positioned either on the left or right side of a wheel end. So, instead of manufacturing different configurations of tapered tappets (e.g., "left-hand tapered tappets" and "right-hand tapered tappets") for left or right sides of a wheel end, a single configuration can be used, with the tappet 200 being rotated such that the protruding end 500 is in the desired location. Once the tappet 200 is "clocked" in the desired position, the tappet 200 can be fixed in position by an anti-rotation device, such as with an elastomeric bellow (boot) positioned round the rear of the tappet 200 to seal against contaminants.

Not only does the use of such a "universal" tapered tappet reduce manufacturing complexity by requiring only a single tapper tappet design to be manufactured, it also eliminates the need to stock different types of tapered tappet for different uses. Further, the "universal" tapered tappet avoids the possibility of installing the wrong type of tappet at a given wheel end. This also provides an advantage over an alternative embodiment where the backing plate is tapered and the tappet is flat, as a tapered backing plate can only be used on certain wheel ends and is not universal.

There are many alternatives that can be used with these embodiments. For example, as noted above, the shapes of the tappet 200 and the backing plate 115 can vary, as can the features on the tappet 200 and backing plate 115 used to key/register the tappet 200 and backing plate 115 (the keying/registering feature does not need to be used). Also, while a tapered tappet 200 was described with a single piston design, multiple tapered tappets can be used on a multi-piston braking system (e.g., two tapered tappets can be used in a two-tappet system) and, as discussed below, on a single piston with features that mimic multiple tappets. Further, while a centered piston system is discussed above, it should be understood that a tapered tappet can be used in a system where the piston is off-center with respect to the center of the backing plate.

Other embodiments and variations can be used, such as the ones discussed below, for example Examples of Tappets and Brake Pad Backing Plates with Interface Features In the example tappet 200 and backing plate 115 discussed above, the top surface 220 of the tappet 200 generally mated with a matching profile/recess formed in the backing plate 115. This provided a uniquely-shaped interface, with a certain design of the backing plate 115 being keyed to a certain design of the tappet 200. In addition to possibly providing resistance to the forces being applied by the rotor 130 as it rotates, this unique interface feature can ensure that only authorized backing plates are used with a given tappet, or vice versa (e.g., to prevent competitors from producing an aftermarket brake pad that works with a certain braking system (non-mating backing plates may not work properly)). Further, depending on the design, the interface feature can also serve as a guide to install a brake pad/backing plate into place in the braking system, as will be discussed below.

Figure 7A:
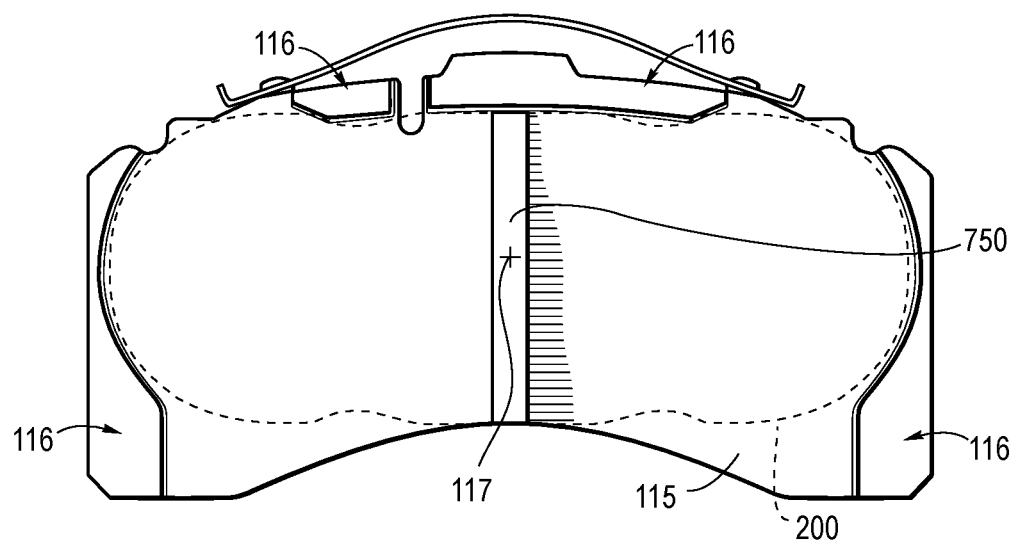
FIG. 7A is an illustration of a brake pad backing plate of an embodiment with a raised surface.
Figure 7B:
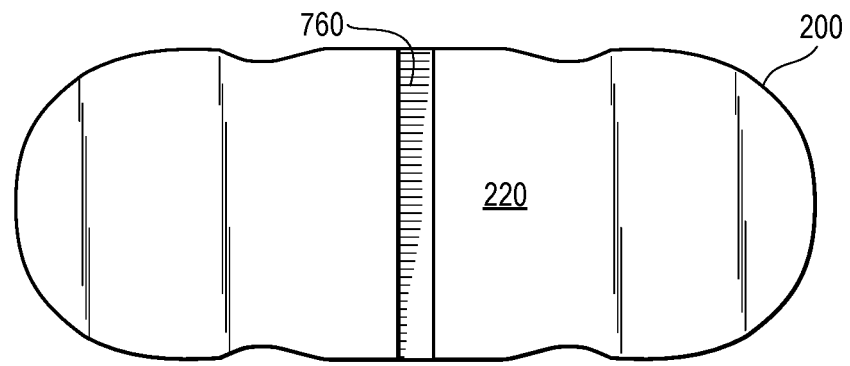
FIG. 7B is an illustration of a tappet of an embodiment having a recess that mates with the raised surface in the brake pad backing plate of FIG. 7A.

Instead of or in addition to using a matching profile/recess interface as in the above examples, the backing plate 115 can have one or more raised surfaces 750 that mate with a corresponding one or more recesses 760 in the top surface 220 of the tappet 200 (see FIGS. 7A and 7B). Many alternatives are possible. For example, instead of the raised surface 750 being on the backing plate 115 and the recess 760 being in the tappet 200, the raised surface can be on the tappet 200, and the recess can be on the backing plate 115. As another alternative, multiple recess/raised surface pairs can be used. In some embodiments, all of the recesses are on the backing plate (or the tappet), and all of the raised surfaces are on the tappet (or backing plate). In another embodiment, both the backing plate and the tappet have recesses and raised surfaces. Also, as mentioned above, instead of or in addition to raised surfaces or recesses on the top surface 220 of the tappet 200 acting as an interface, the entire outer shape of the tappet 200 can serve as an interface, as in FIGS. 3B and 7A.

Many different configurations of tappets, backing plates, and interfaces are possible. The following paragraphs provide some example configurations. It should be understood that these are merely examples and that other types of configurations can be used.

Figure 8A:
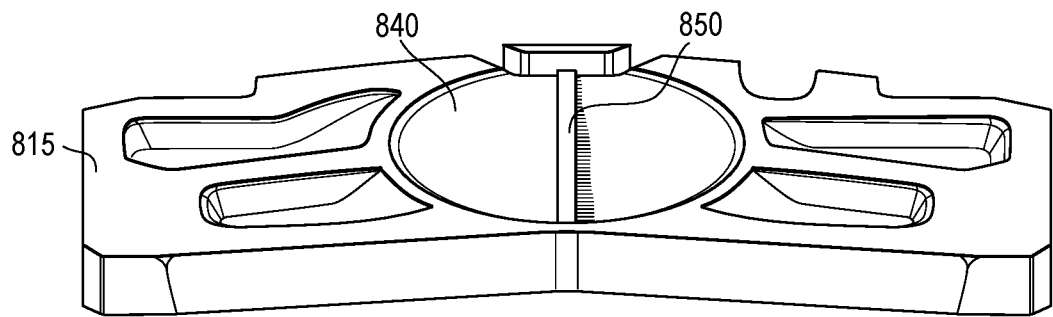
FIG. 8A is an illustration of a brake pad backing plate of an embodiment with a raised surface.
Figure 8B:
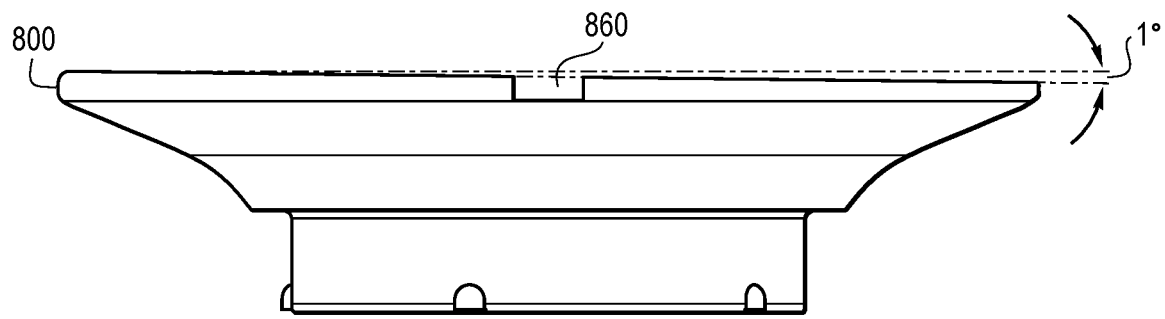
FIG. 8B is a side view of a tappet of an embodiment having with a recess that mates with the raised surface in the brake pad backing plate in FIG. 8A.
Figure 8C:
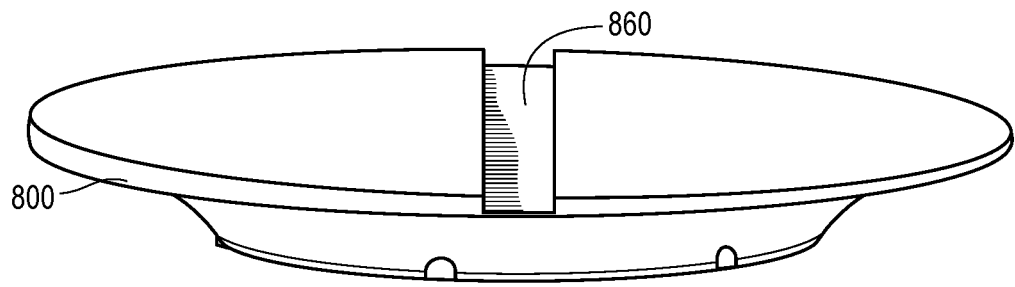
FIG. 8C is a perspective view of the tappet in FIG. 8B.

Returning to the drawings, FIG. 8A is an illustration of a backing plate 815 of another embodiment. As can be seen by a comparison with the backing plate 115 shown in FIG. 3A, the backing plate 815 of this embodiment has a different overall shape (perimeter). Also, this backing plate 815 is configured for use with a single, circular tappet 800 (see FIGS. 8B and 8C) and has a circular recess 840 to receive the perimeter of the single, circular tappet 800. This is in contrast to the design in FIG. 3A, where the tappet 200 was a generally-oval shape that contacted more of the surface of the backing plate 115. As shown in FIGS. 8A, 8B, and 8C, in this embodiment, in addition to the interface features of a circular recess 840 in the backing plate 815 matching the circular shape of the tappet 800, the backing plate 815 contains a raised portion 850 that mates with a recess 860 in the tappet 800. This unique interface feature can ensure that only brake pad backing plates with matching features can be used with the tappet 800. This may also provide resistance to rotation. Further, this interface feature can serve as a guide to install the backing plate 815 into place in the braking system by sliding the raised surface 850 on the backing plate 815 into the recess 860 in the tappet 800, as will be discussed below.

Figure 8D:
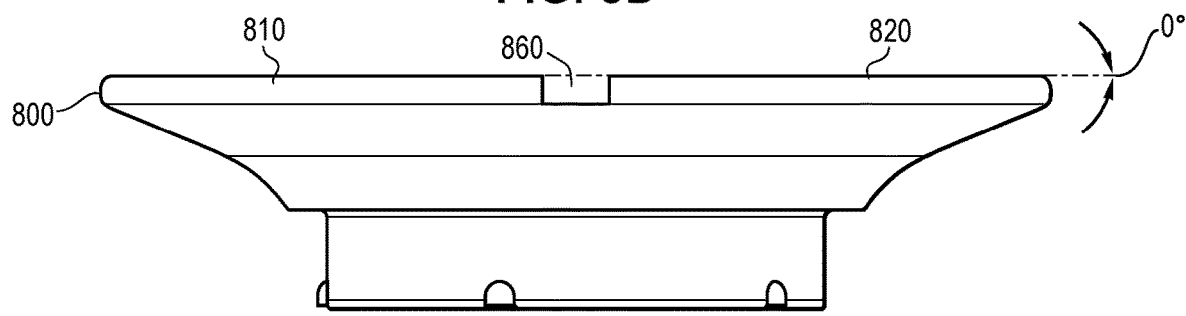
FIG. 8E is a side view of a tappet of an embodiment having with a recess and portions with non-tapered but non-uniform heights.
Figure 8E:
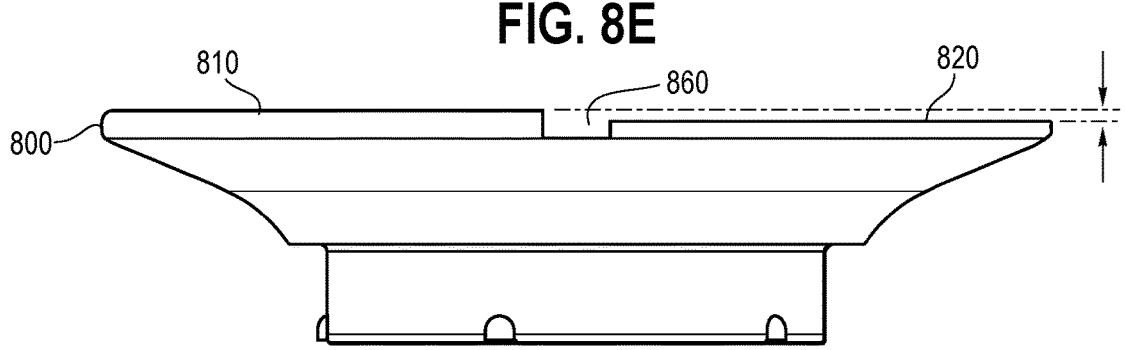

In the example tappet 800 shown in FIGS. 8B and 8C, the top surface of the tappet 800 has a taper to provide the counterforce discussed above. However, it should be noted that the unique mating interface feature can be used without the taper feature. For example, as shown in FIG. 8D, the tappet 800 can have a non-tapered top surface, such that the portions 810, 820 of the tappet 800 on either side of the recess 860 have the same height. As another alternative (see FIG. 8E), the portions 810, 820 of the tappet 800 on either side of the recess 860 can have different, non-tapered heights, which, similar to the tapered design, may provide the counterforce discussed above.

Figure 9A:
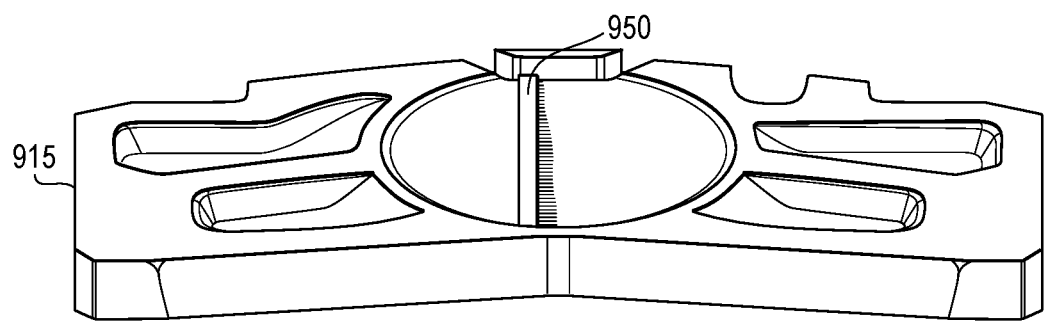
FIG. 9A is an illustration of a brake pad backing plate of an embodiment with a raised surface offset from a center of the brake pad backing plate.
Figure 9B:
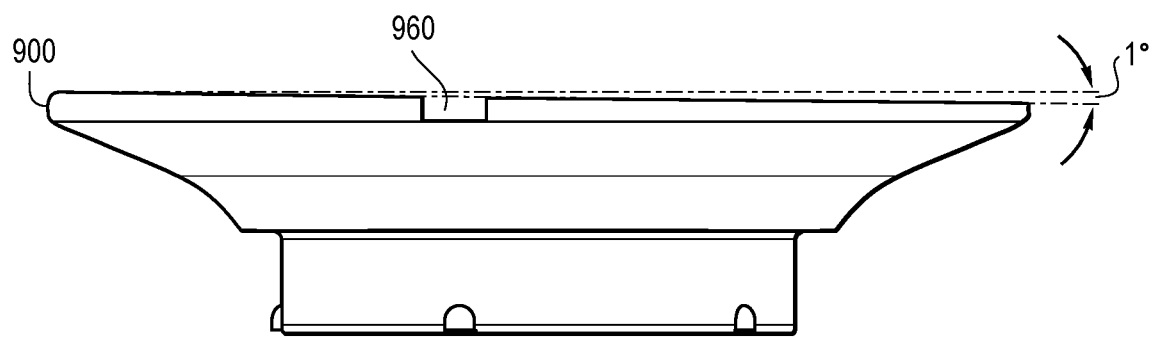
FIG. 9B is a side view of a tappet of an embodiment having with a recess and a tapered top surface, where the recess is offset from the center of the tappet.
Figure 10A:
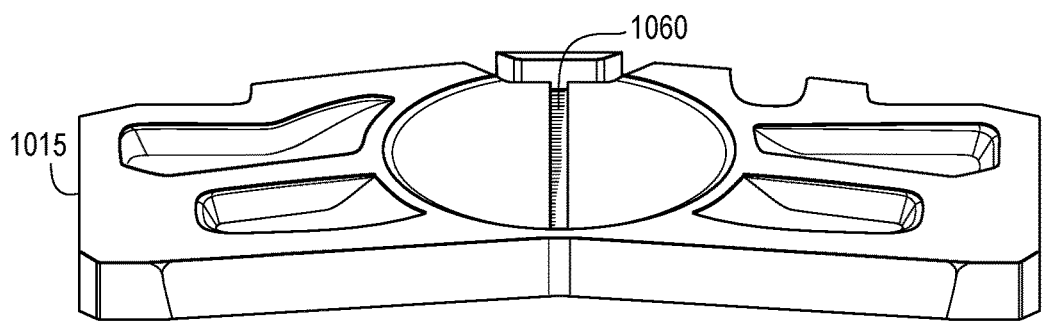
FIG. 10A is an illustration of a brake pad backing plate of an embodiment with a recess.
Figure 10B:
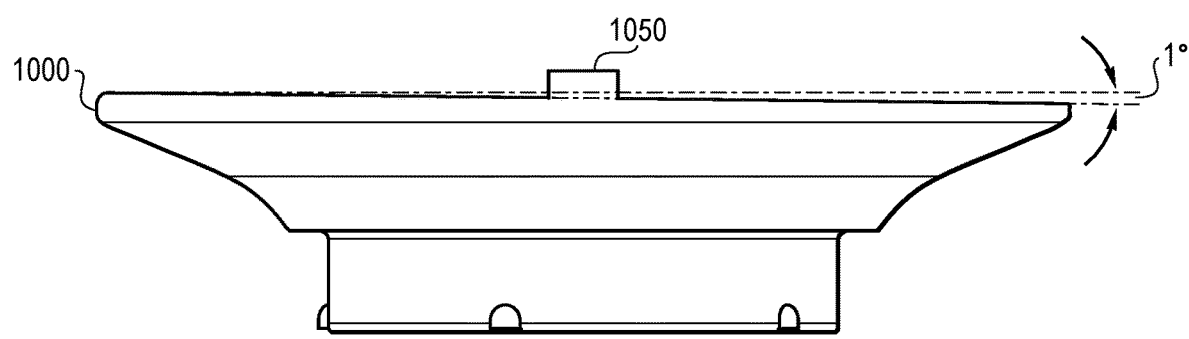
FIG. 10B is a side view of a tappet of an embodiment having a raised surface that mates with the recess in the brake pad backing plate in FIG. 10A.

Of course, many alternatives are possible. For example, as shown in FIGS. 9A and 9B, instead of the recess/raised surface 950, 960 being at the center of the brake pad backing plate 915 and tappet 900, the recess/raised surface 950, 960 can be off-center. Also, as shown in FIGS. 10A and 10B, instead of the recess being in the tappet and the raised surface being on the backing plate, the opposite configuration can be used, where the recess 1060 is in the backing plate 1015 and the raised surface 1050 is on the tappet 1000. Many other configurations are possible. For example, as noted above, the backing plate and the tappet can each have both recesses and raised surfaces in the same or varying shapes and sizes. Also, while the tappets 900, 1000 in FIGS. 9A, 9B, 10A, and 10B are tapered, as noted above, non-tapered tappets can be used.

Figure 10C:
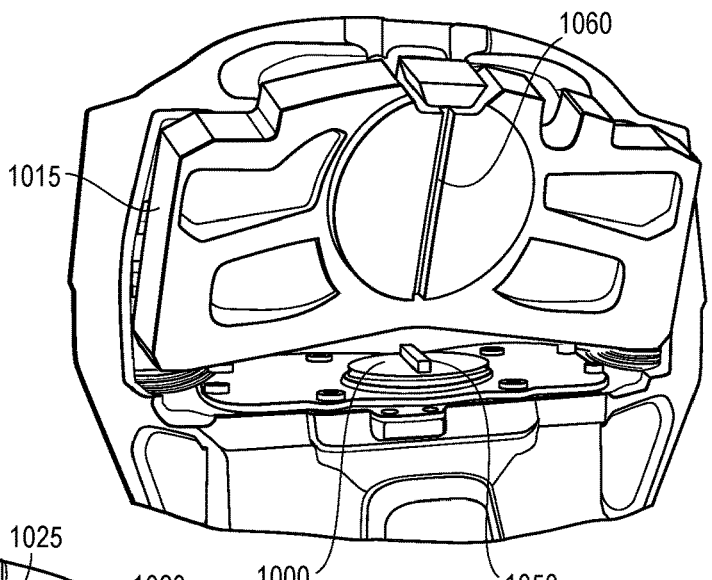
FIG. 10C is an illustration of a brake pad backing plate of an embodiment prior to the brake pad backing plate being installed in a braking system.
Figure 10D:
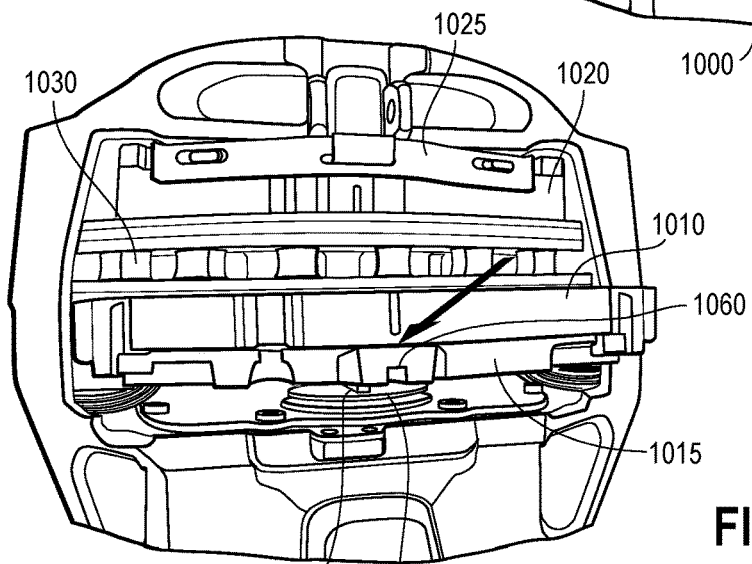
FIG. 10E, is an illustration of a brake pad backing plate of an embodiment installed in a braking system.
Figure 10E:
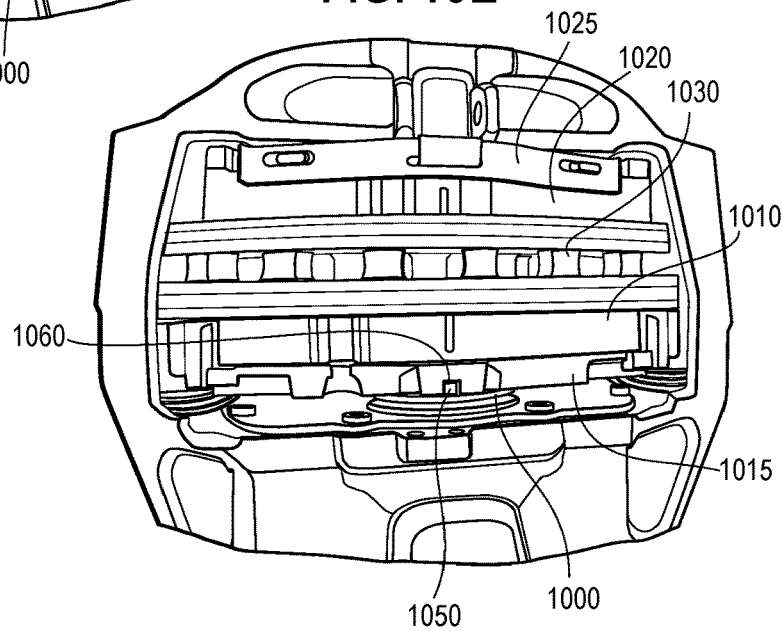

As also noted above, the interface features can serve as a guide to install the backing plate into place in a braking system. This will now be discussed in conjunction with FIGS. 10C-10E. FIG. 10C is an illustration of the brake pad backing plate 1015 prior to its installation in the braking system. As shown in FIG. 10D, to install the inner brake pad 1010 and brake pad backing plate 1015, the brake pad backing plate 1015 is positioned such that the recess 1060 in the brake pad backing plate 1015 can slide over the raised surface 1050 of the tappet 1000. FIG. 10E shows the inner brake pad 1010 and brake pad backing plate 1015 fully installed. FIG. 10E also shows the outer brake pad 1020 and its backing plate 1025, as well as the rotor 1030.

Figure 11A:
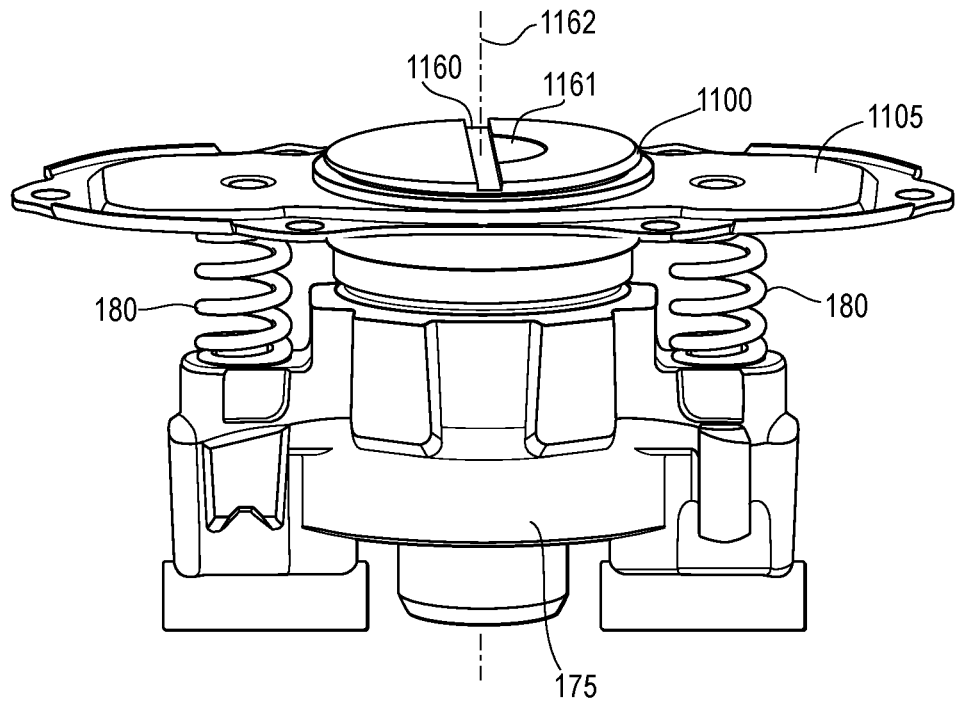
FIG. 11A is a perspective view of a tappet of an embodiment.
Figure 11B:
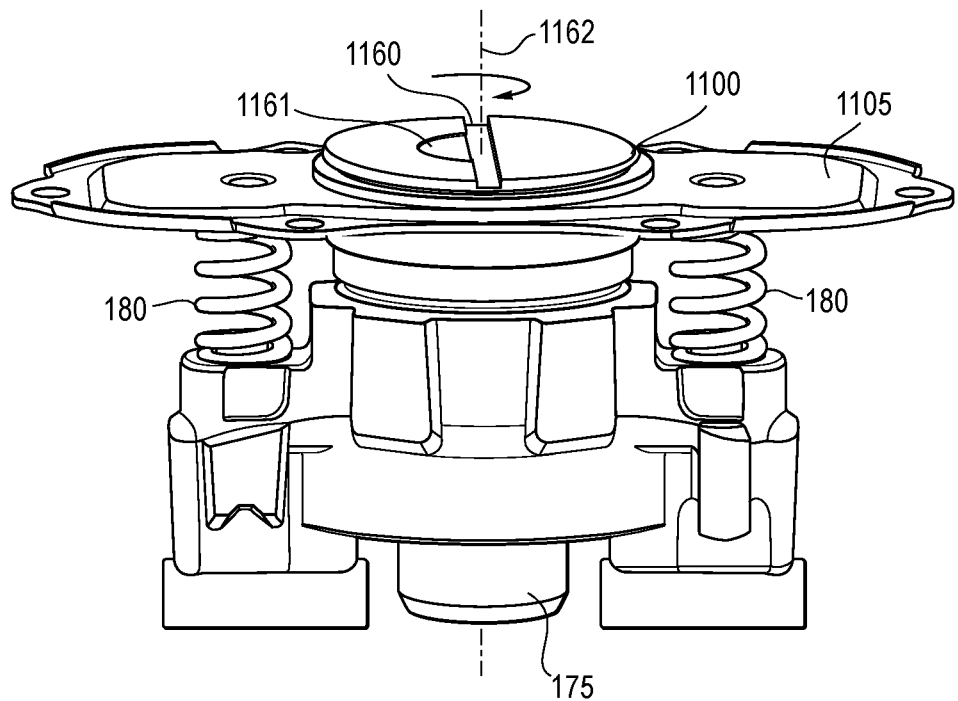
FIG. 11B is a perspective side view of the tappet in FIG. 11A rotated ISO degrees.

Returning to the drawings, FIGS. 11A and 11B illustrate another configuration of a tappet 1100. This drawing allows shows a cover plate 1105, the return springs 180, and the bridge 175, although other configurations and components can be used. As shown in these drawings, the tappet 1100 is tapered, although, as noted above, a non-tapered design can be used. Also, instead of the recess being a rectangular shape, the recess in this example is a combination of a rectangular shape 1160 with a half-circle shape 1161, which would mate with an opposing protruding shape on the backing plate. These drawings also show that this tappet 1100, as with at least some of the tappets discussed above, can be rotated 180 degrees about its center axis 1162 and oriented into the caliper during assembly to position the plunger accordingly to provide universality.

Figure 12A:
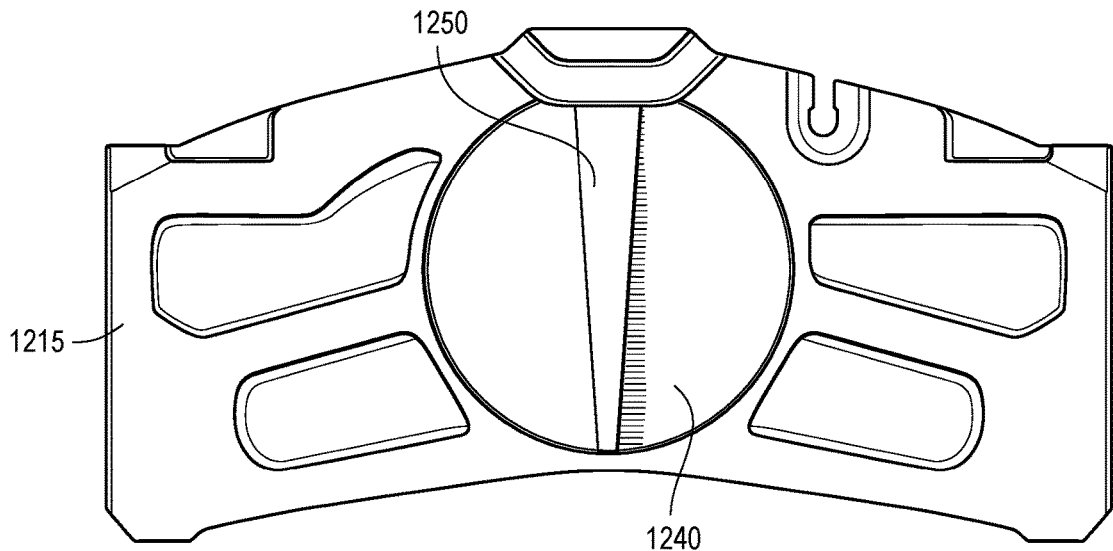
FIG. 12A is a top view of a brake pad backing plate of an embodiment with a triangular raised surface.
Figure 12B:
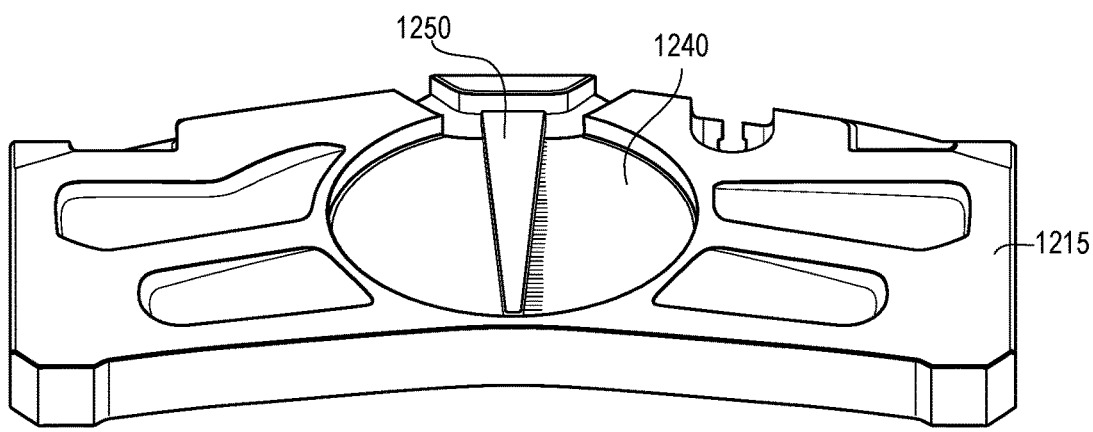
FIG. 12B is a perspective bottom view of the brake pad backing plate of FIG. 12A.
Figure 13A:
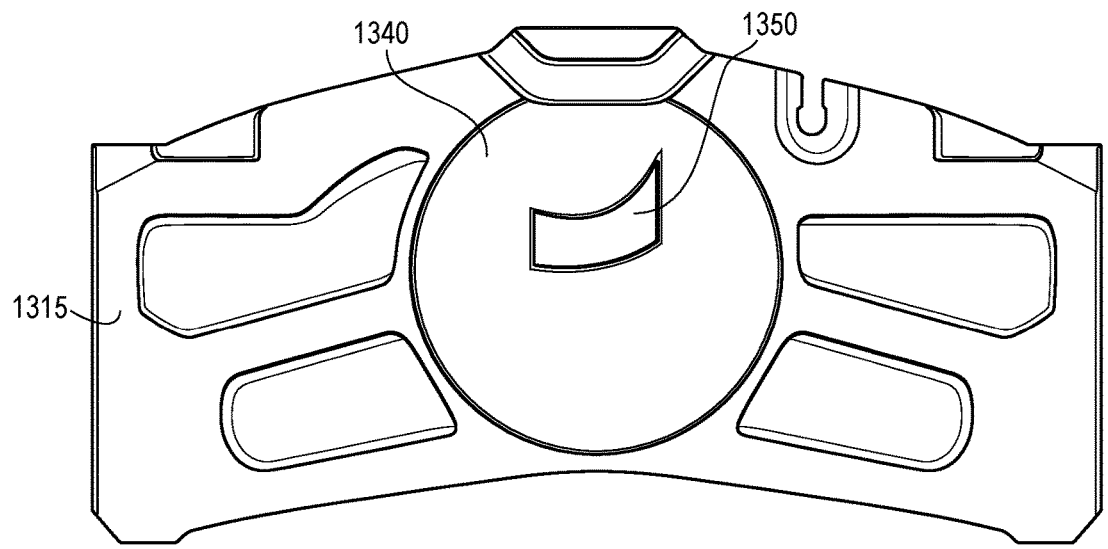
FIG. 13A is a top view of a brake pad backing plate of an embodiment with a curved trapezoidal-type raised surface.
Figure 13B:
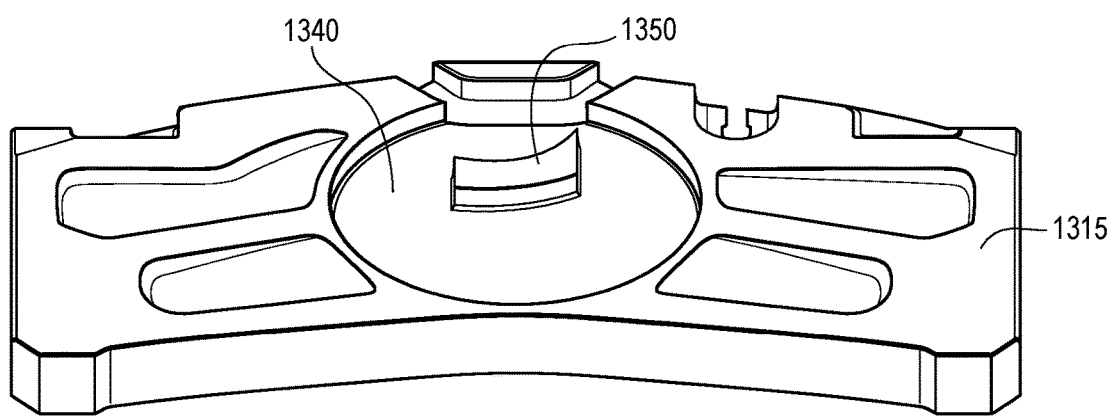
FIG. 13B is a perspective bottom view of the brake pad backing plate of FIG. 13A, FIGS. 14A-14D are illustrations of a brake pad backing plate of an embodiment with horizontal features.

Again, many different shapes and sizes of the recess(es)/raised surface(s) can be used. For example, the backing plate 1215 shown in FIGS. 12A and 12B has both a recessed circular portion 1240 for receiving a tappet with a circular outer shape, as well a raised surface with a triangular "wedge" shape 1250 that would mate with a corresponding recess in the tappet. As another example, the backing plate 1315 shown in FIGS. 13A and 13B has both a recessed circular portion 1340 for receiving a tappet with a circular outer shape, as well a raised surface with curved trapezoidal-type shape 1350 that would mate with a corresponding recess in the tappet. The shape can be any arbitrary shape or can have some significance, such as a logo of a manufacturer of the brake pad/backing plate and tappet. Also, interface features can be shaped or placed on the backing plate to supplement the strength of the backing plate in critical areas, such as the center of the backing plate.

As noted above, many alternatives are possible, such as the position of the recess/raised surface (e.g., male or female features (debossed or embossed)) being juxtaposed between the backing plate and the tappet, as well as the backing plate and tappet containing both recesses and raised surfaces. Further, the interface features do not have to be on the entire length of the tappet or backing plate. As also noted above, the top surface of the tappet can be tapered, non-tapered, and/or have portions with uniform or non-uniform heights. Also, these embodiments can be used alone or in combination with the embodiments discussed above and/or below.

Again, many different shapes and sizes of the recess(es)/raised surface(s) can be used. For example, the backing plate 1350 shown in FIG. 14A has both a recessed circular portion for receiving a tappet with a circular outer shape (perimeter), as well a raised surface with a horizonal feature 1362 that would mate with a corresponding recess in the tappet. More specifically, in FIG. 14A, the single horizontal feature 1362 tapers up towards the right. This can be used, for example, on a brake where the inboard pad is oriented such that the pad will travel away from the upwards taper. In this case, the pad will move to the left so as not to self-lock into the groove/onto the taper. Note, this can make the pad "handed." Also, to address tapered wear, the tappet face can have an angle to it.

Figure 14A:
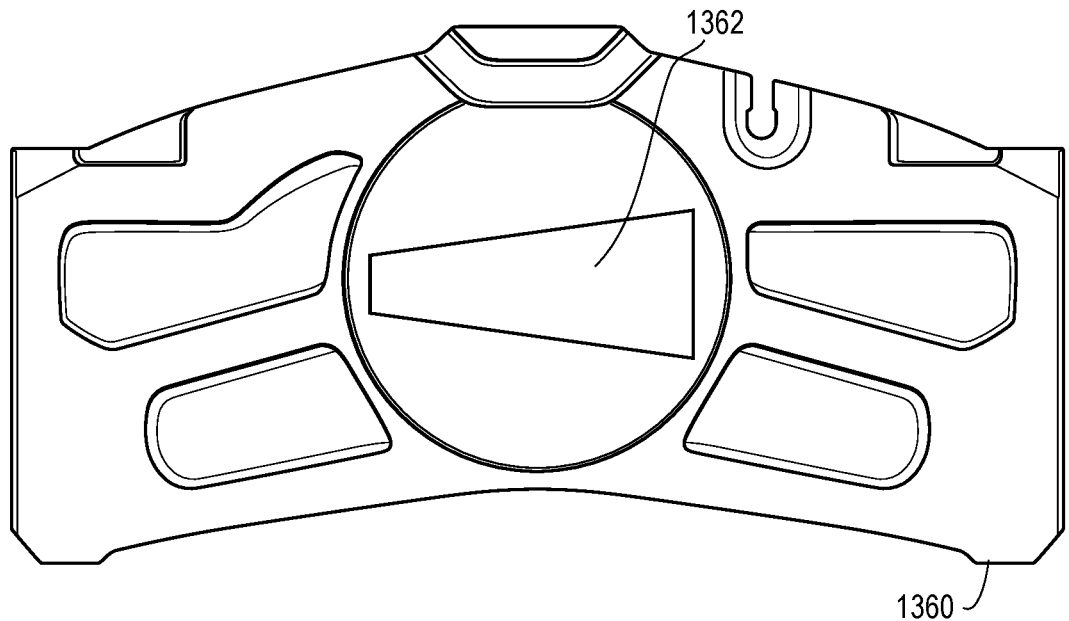
Figure 14B:
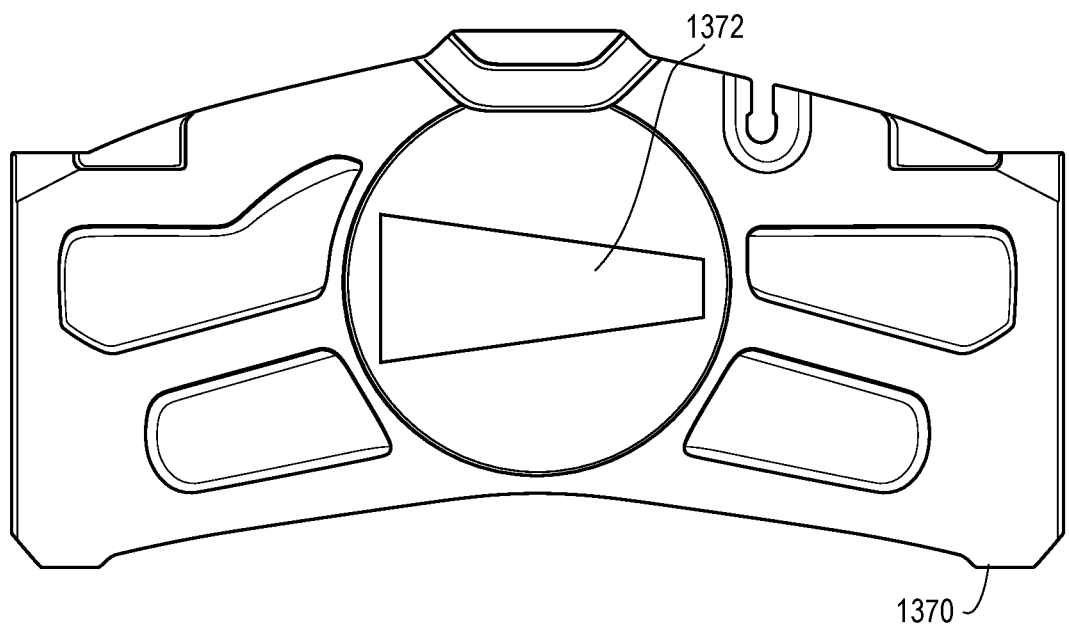

As another configuration, the backing plate 1370 shown in FIG. 14B has a single horizontal feature 1372 that tapers up towards the left. This can be used on a brake where the inboard pad is oriented such that the pad will travel away from the upwards taper. In this case, the pad will move to the right so as not to self-lock into the groove/onto the taper. Note, this would make the pad "handed" (in the opposite way as FIG. 14A). Also, to address tapered wear, the tappet face can have an angle to it.

So, in FIGS. 14A and 14B, the triangular "wedge" shapes 1362, 1372 are oriented horizontally (not vertically). The orientation is such that it may help prevent contact and/or a locking of the wedge shapes 1362, 1372 between the brake pad backing plate interface feature (wedges) and tappet interface feature (wedge) during braking, as compared to a vertical arrangement.

In yet another configuration, two horizontally oriented wedge shapes are used that would mate with a corresponding recess in the tappet with similar features. The shape can be a tapered angle or wedge shape, or two mated tapered angles or wedges oriented with the tapers away from or towards one another. Such shapes may also serve to prevent a contact and potential locking between the tappet feature and the backing plate feature as the backing plate slides towards or away from it during braking.

Figure 14C:
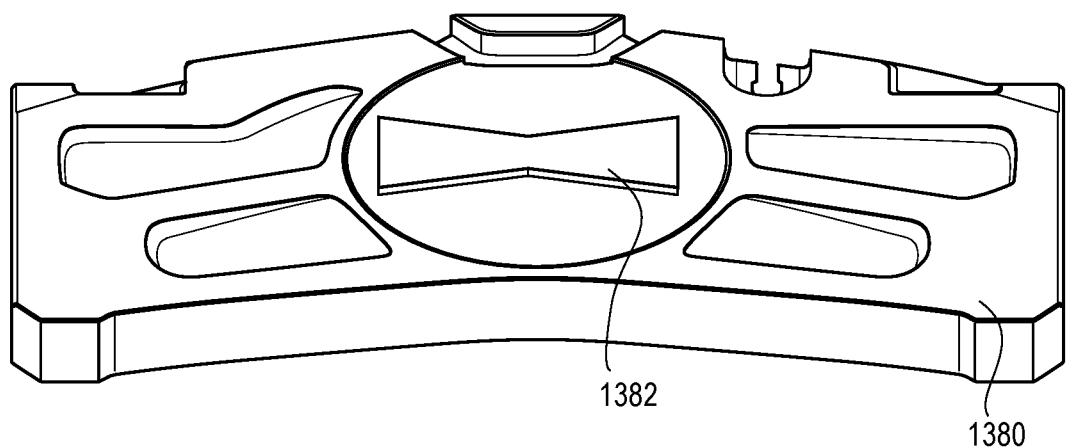
Figure 14D:
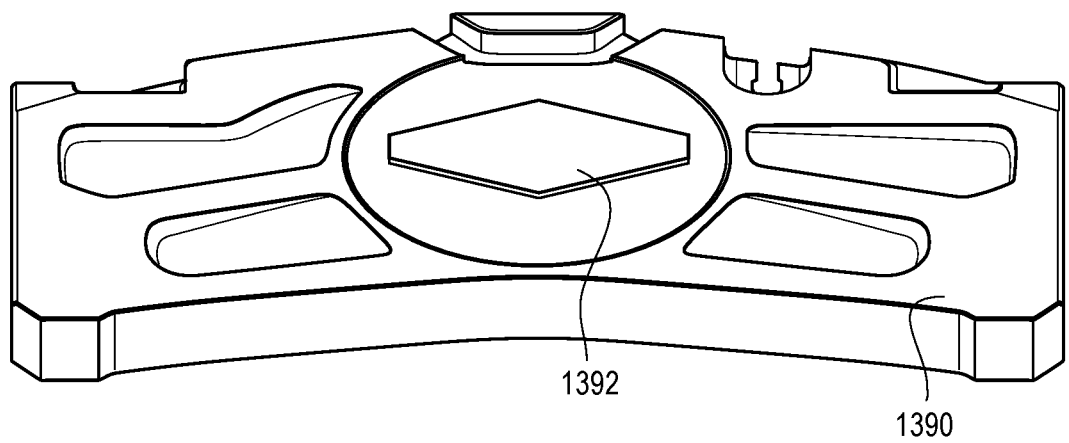

More specifically, in FIG. 14C, the backing plate 1380 has a groove design 1382 where the features are tall on each end and taper in towards the center. The tappet can be angled and keyed into this shape. Note, this style may or may not tend to self-lock if the pad shifts to the right or left. This would not be a handed pad. In FIG. 14D, the backing plate 1390 has a groove design 1392 where the features are short on each end and taper up towards the center. The tappet can be angled and keyed into this shape. Note, this style may or may not tend to self-lock if the pad shifts to the right or left. This would also not be a handed pad.

Examples of Single Air Disc Brake Tappets with Features That Mimic Multiple Tappets As noted above, to reduce cost and complexity, a single tappet can be used. However, unlike a two-tappet brake which distributes braking force over left- and right-sides of the backing plate, the tappet in a single-tappet brake can contact a smaller surface of the backing plate. So, as compared to using a two-tappet brake, using a single-tappet brake can result in an uneven distribution of braking force and, hence, uneven wear of the inner brake pad. More specifically, at the rotor rotates, the leading edge of the inner brake pad can see more application pressure on it due to the unequal force distribution caused by the moment created between the brake pad drag force and abutment force, thereby causing the leading edge of the inner brake pad to wear faster than the trailing edge of the inner brake pad. The tapered tappet designs in the above embodiments can be used to partially or completely counteract this force to address this problem.

Figure 15A:
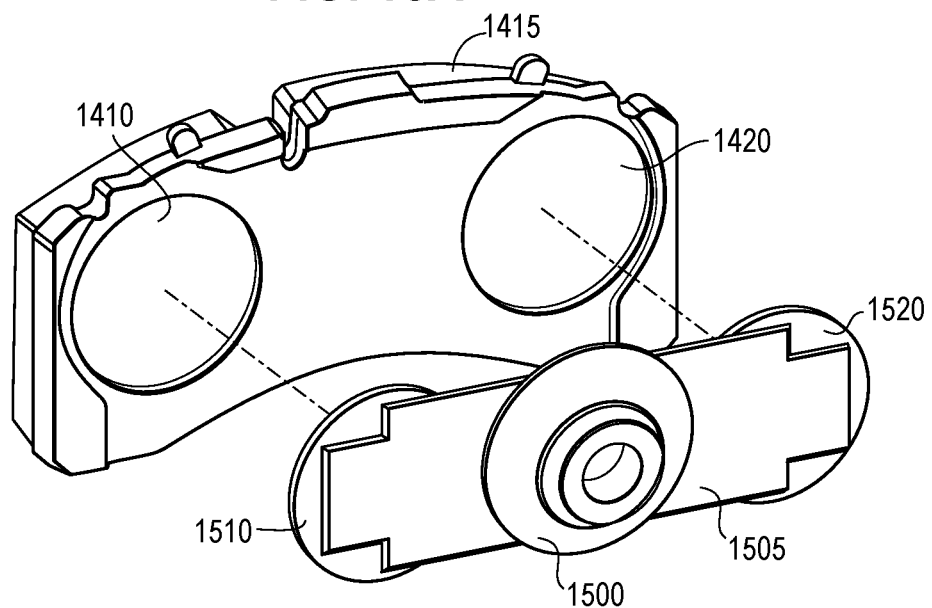
FIG. 15A is an illustration of a brake pad backing plate and a single tappet of an embodiment that has features that mimic multiple tappets.
Figure 15B:
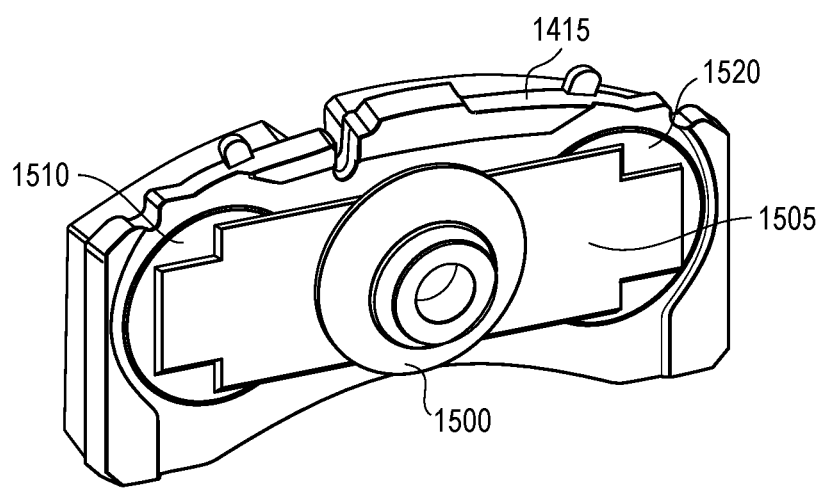
FIG. 15B is an illustration of a tappet pushing against a brake pad backing plate of an embodiment.
Figure 15C:
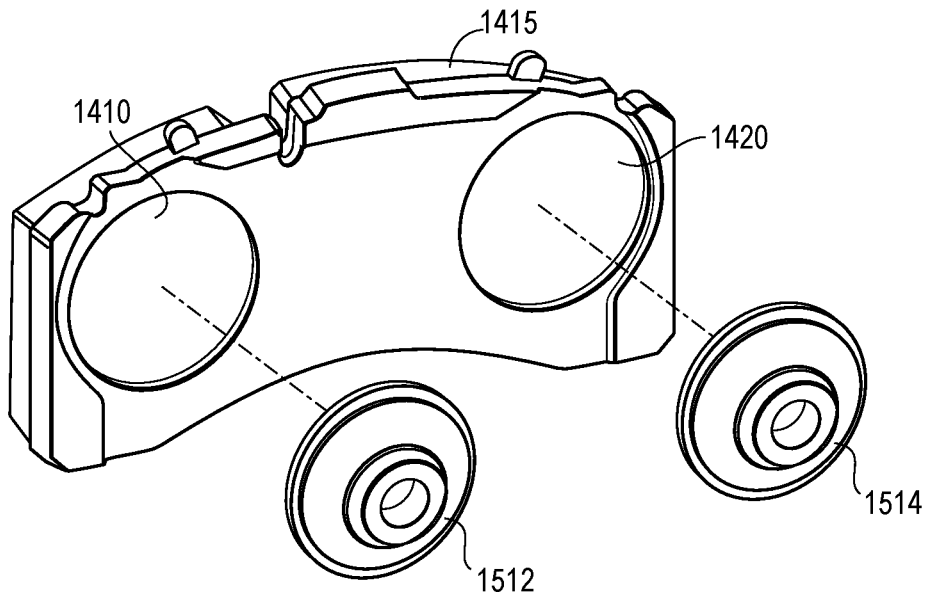
FIG. 15C is an illustration of a brake pad backing plate and a double tappet of an embodiment.
Figure 15D:
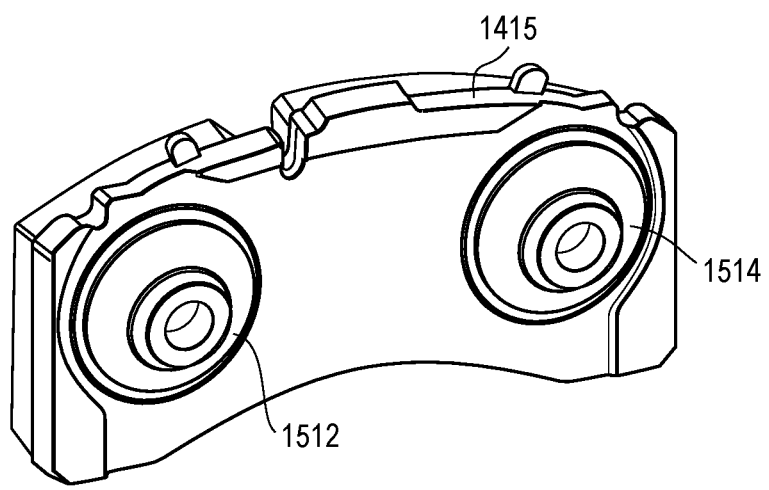
FIG. 15D is an illustration of double tappets pushing against a brake pad backing plate of an embodiment.

In another embodiment (see FIGS. 15A and 15B), a single tappet 1500 is used with raised features 1510, 1520 on a plate 1505 that mimic multiple tappets. (In one embodiment, the distance between centers of the raised features 1510, 1520 is about 131 mm, although any suitable distance can be used.) This provides a "best of both worlds" design, as the single tappet 1500 reduces the cost and complexity with respect to a two-tappet system, while the raised features 1510, 1520 provide at least some, if not all, of the force-distribution benefits of a two-tappet system. These raised features 1510, 1520 can distribute the force on a backing plate, which can prevent bending or damage to the backing plate and brake pad, thereby avoiding a possible need to create a very thick or strong (and consequently heavy) backing plate that resists bending or damage. In another embodiment (shown in FIGS. 15C and 15D), two tappets 1512, 1514 are used. However, unlike prior two-tapped designs, the outer shape (perimeter) of the two tappets are keyed to at least part of the shape of the recesses 1410, 1420 in the backing plate. The various configurations and options (e.g., sizes and shapes of the tappets, how the tappets fully or partially mate with the recesses, using (or not using) a taper, etc.) can be applied to this alternative as well.

These embodiments can be used alone or in combination with the interface features and/or tapered design discussed above. For example, in the embodiment shown in FIGS. 15A and 15B, the raised features 1510, 1520 are circular in shape and mate with corresponding recesses 1410, 1420 in the backing plate (the female recesses 1410, 1420 in the backing plate 1415 can also be used to receive male tappets in a two-tappet braking system).

Figure 16A:
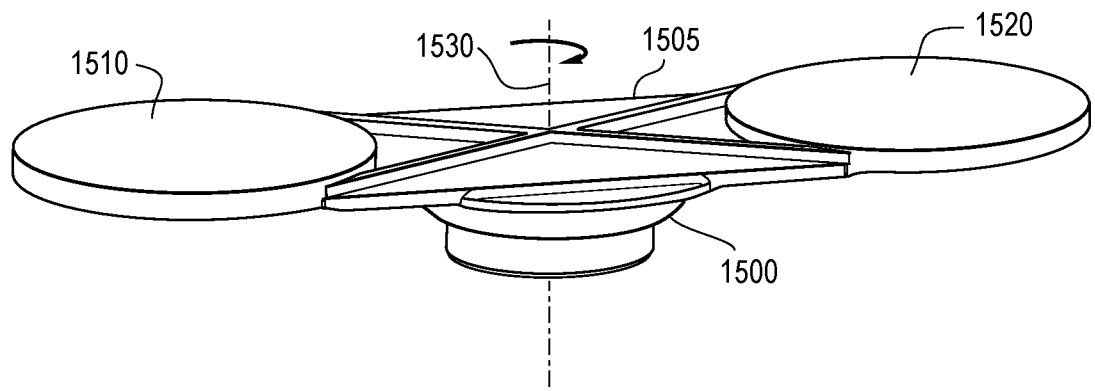
FIG. 16A is a perspective view of a tappet of an embodiment with two raised features that mimic two tappets.
Figure 16B:
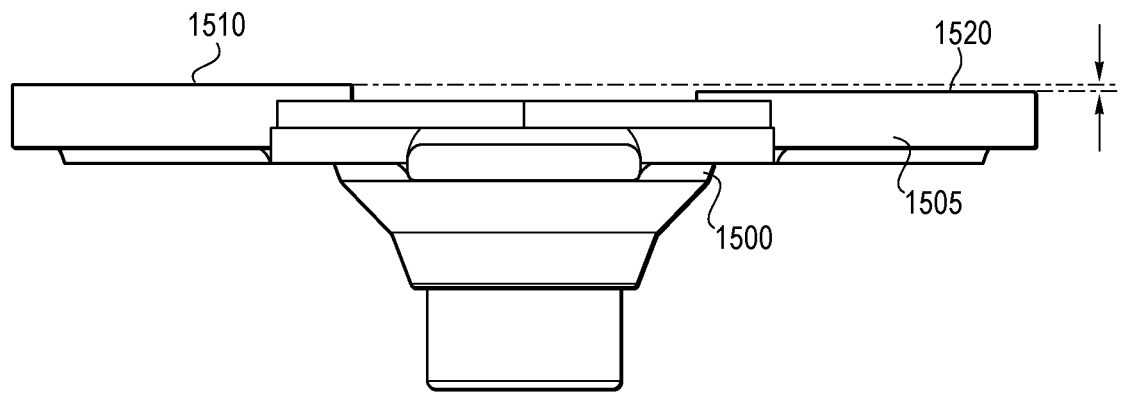
FIG. 16B is a side view of a tappet of an embodiment where the two raised features that mimic two tappets have non-tapered but non-uniform heights.
Figure 16C:
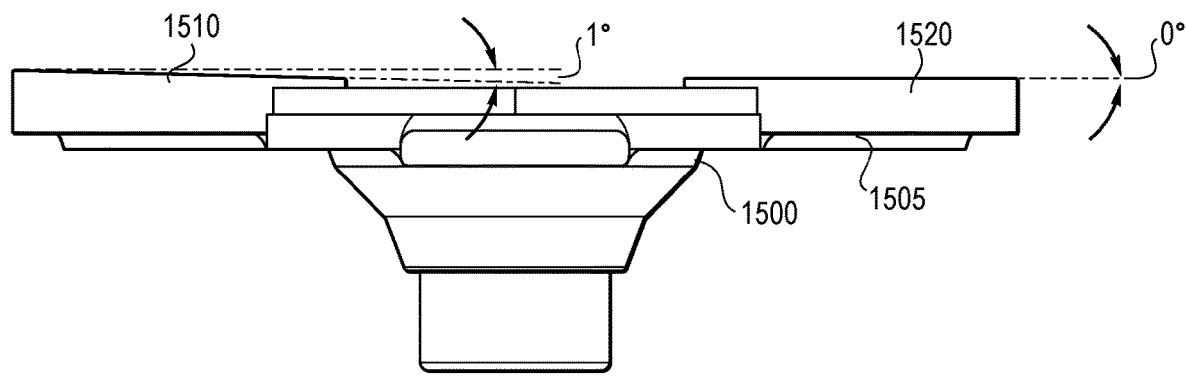
FIG. 16C is a side view of a tappet of an embodiment where one of the two raised features that mimic two tappets is tapered.
Figure 16D:
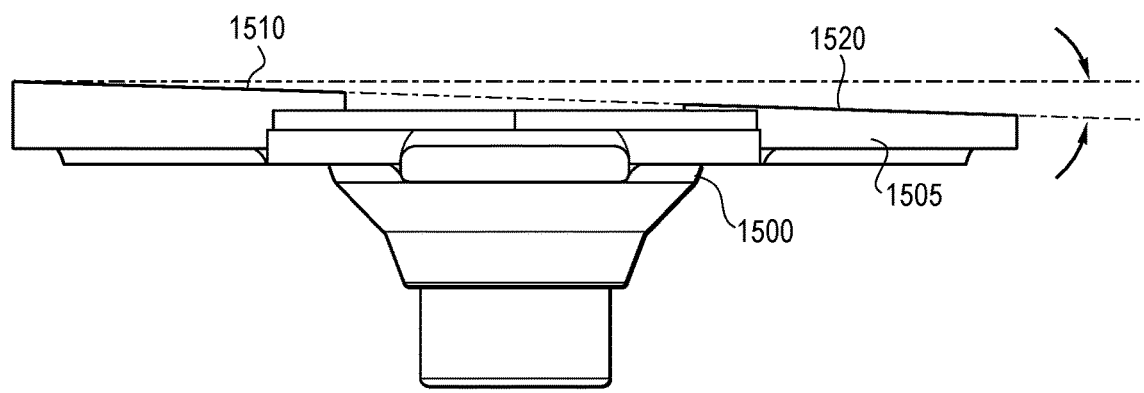
FIG. 16D is a side view of a tappet of an embodiment where both of the two raised features that mimic two tappets are tapered.
Figure 16E:
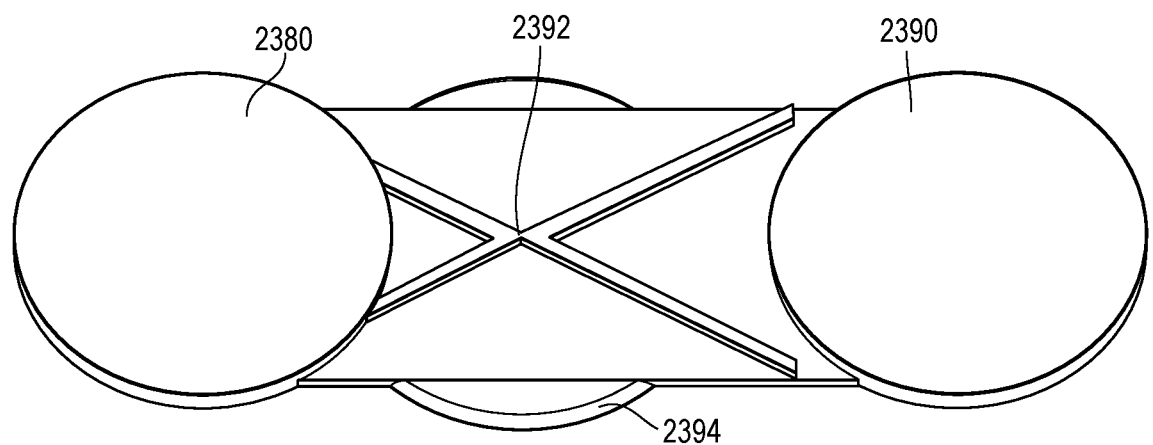
FIGS. 16E and 16F are illustrations of a tappet of an embodiment that has offset features that mimic multiple tappets.
Figure 16F:
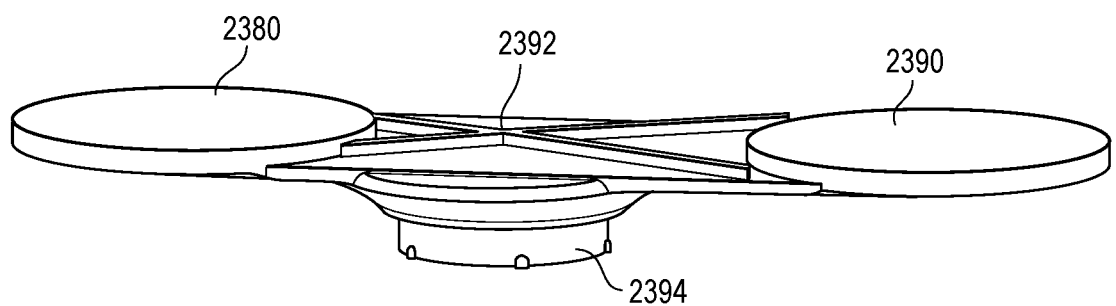

Also, as shown in FIG. 16A, the overall shape of the top of the tappet 1500 can be symmetrical, so a 180-degree rotation of the tappet 1500 can move the position of the raised features 1510, 1520 to the opposite side of the backing plate 1415 to provide the universality advantages discussed above (e.g., the tappet 1500 can be used on both left- and right-handed brakes). (FIG. 15A also shows that the plate 1505 in this embodiment has various reinforcement ribs and features to stiffen and prevent distortion of the plate 1505, as well as the inner brake pad backing plate 1415.) However, in another embodiment (shown in FIGS. 16E and 16F, instead of the raised features being symmetrical, the raised features 2380, 2390 are offset by different distances from the center 2392 of the tappet 2394. In this example, the threaded tube is offset from the center 2392 of the tappet 2394, while, in other examples, the threaded tube is the center 2392 of the tappet 2394.

Turning back to FIG. 16B, the raised features 1510, 1520 can have different, but uniform heights, with one raised feature 1510 being higher than the other raised feature 1520 (e.g., by five millimeters). If each of the recesses 1410, 1420 in the backing plate 1415 have the same depth, the raised feature 1510 with the greater height would contact the backing plate 1415 before the other raised feature 1520. This can provide a tilting action (similar to in the tapered design discussed above) to provide a counteracting force to the force created by the unequal force distribution caused by the moment created between the brake pad drag force and abutment force that can cause uneven wear of the brake pad (e.g., by shifting the pressure point (offset towards the trailing edge) to control tapered pad wear). Alternatively, each recess 1410, 1420 in the backing plate 1415 can have different depths to account for the different heights of the raised features 1510, 1520, which would provide an additional dimension to the keying interface feature. Further, in another embodiment (see FIG. 16D) both raised features 1510, 1520 are tapered.

In another embodiment (shown in FIG. 16C), at least one of the raised features (here, raised feature 1510) can be tapered. In other embodiment, both of the raised features 1510, 1520 are tapered at the same or different angles (e.g., the two raised features 1510, 1520 can be angled with respect to each other.

Figure 17A:
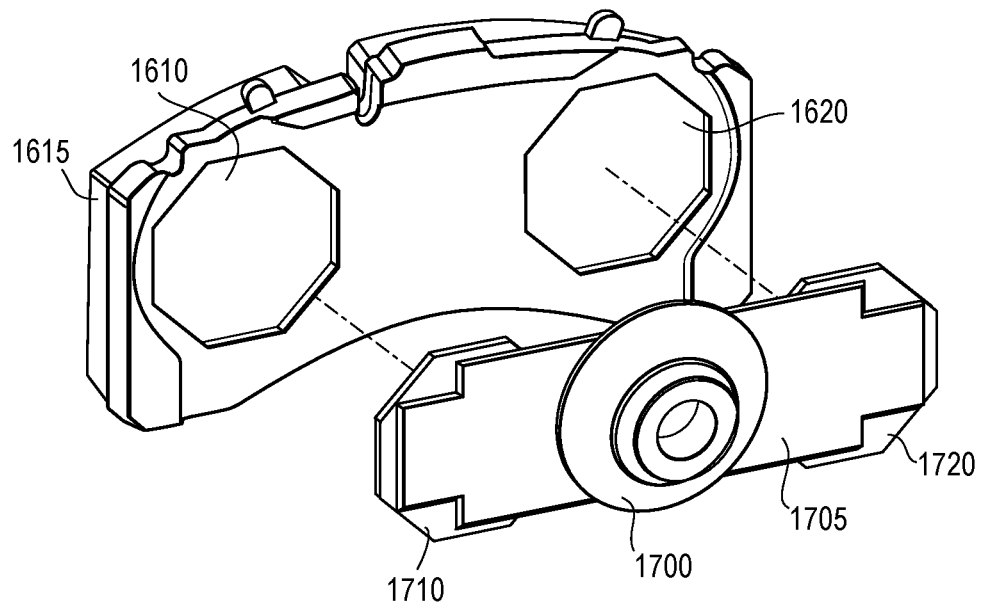
FIG. 17A is an illustration of a brake pad backing plate and a tappet of an embodiment that has features that mimic multiple tappets.
Figure 17B:
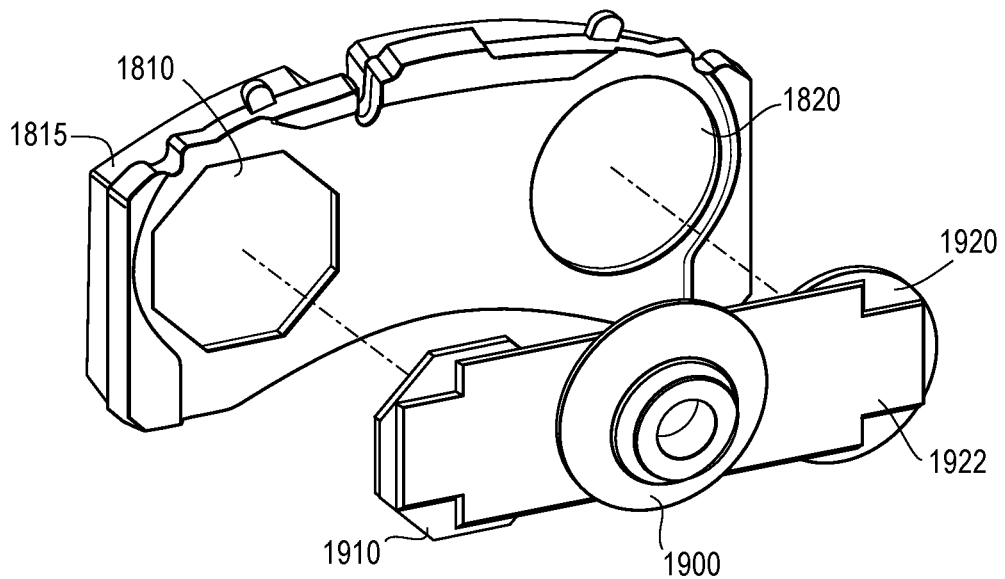

Many alternatives are possible. For example, in FIG. 17A, the tappet 1700 has raised features 1710, 1720 on a plate 1705 of the tappet 1700, but the shape of the raised features 1710, 1720 is an octagon instead of a circle (the mating shapes 1610, 1620 on the backing plate 1615 are also octagon shaped). In yet another embodiment, the raised features and matching recesses are different geometric shapes. For example, in FIG. 17B, the tappet 1900 has an octagonal-shaped raised feature 1910 and a circular-shaped raised feature 1920 on its plate 1922 that match with corresponding shapes 1810, 1820 on the backing plate 1815.

Figure 18A:
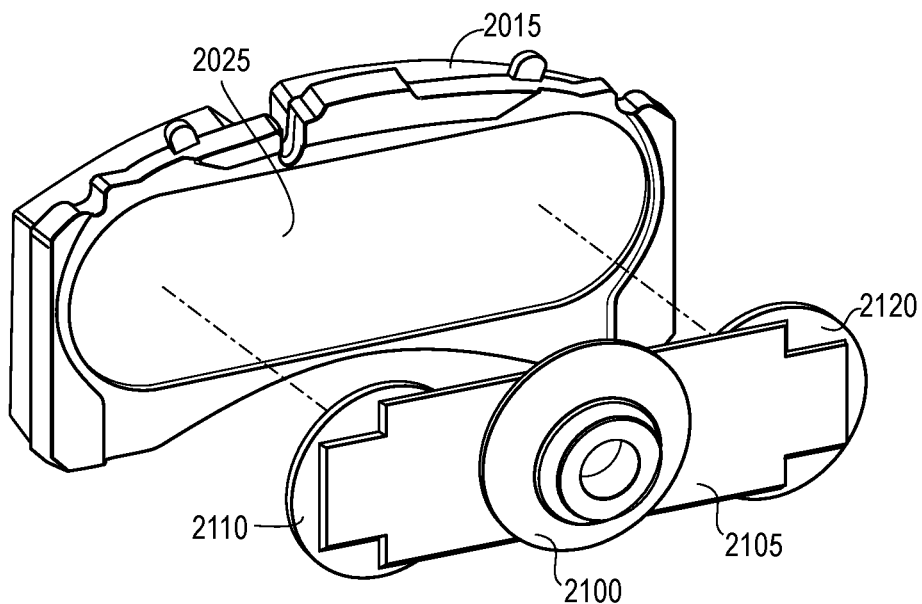
FIG. 18A is an illustration of a brake pad backing plate and a tappet of an embodiment that has features that mimic multiple tappets.
Figure 18B:
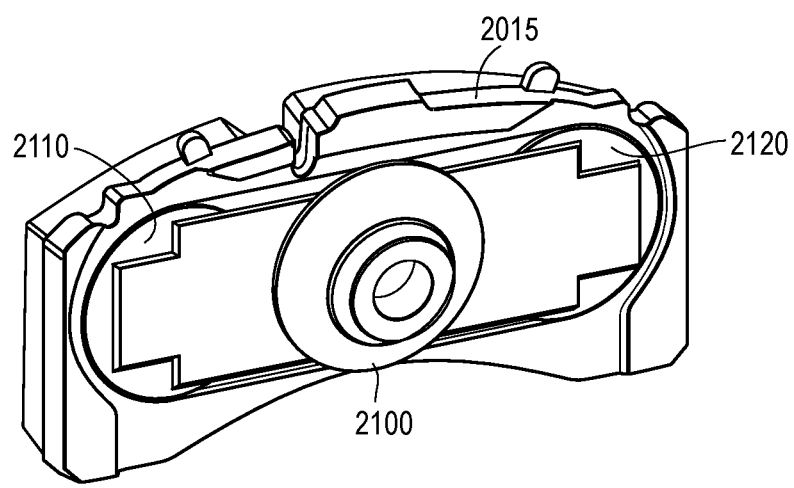
FIG. 18B is an illustration of a tappet pushing against a brake pad backing plate of an embodiment.

Also, as shown in FIGS. 18A and 18B, the recess 2025 in the backing plate 2015 does not necessarily need to exactly match the geometric shapes of the raised features 2110, 2120 on the plate 2105 of the tappet 2100. In the example shown in FIGS. 18A and 18B, the recess 2025 in the backing plate 2015 is large oval that contacts the left 180-degree portion of the left raised feature 2110 and the right 180-degree portion of the right raised feature 2120.

Figure 19A:
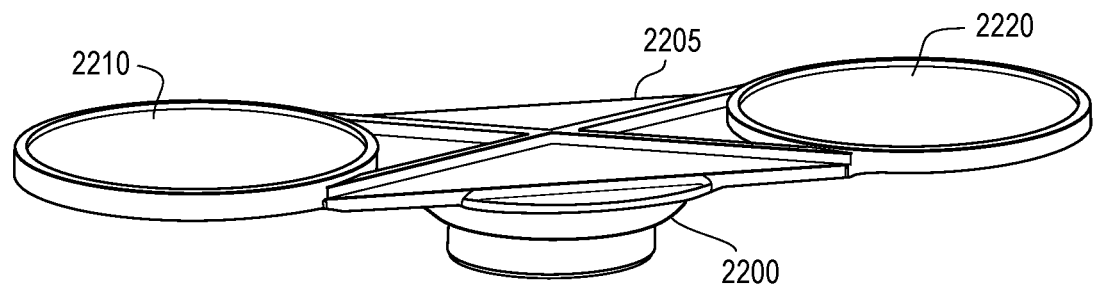
FIG. 19A is a perspective view of a tappet of an embodiment with two raised features that mimic two tappets.
Figure 19B:
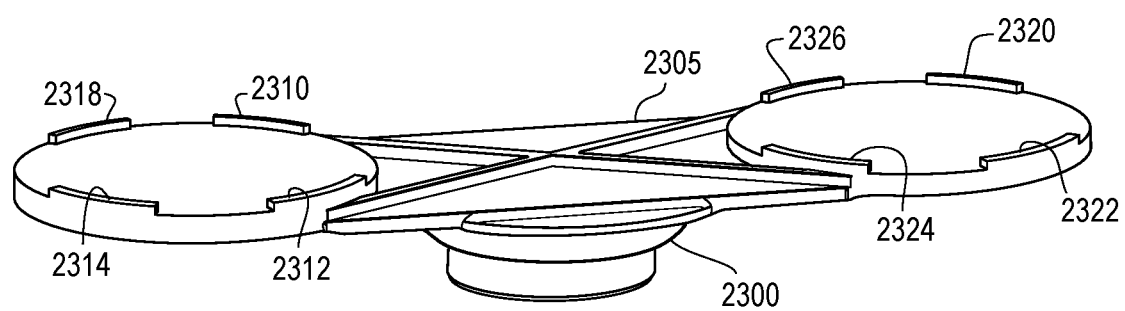
FIG. 19B is a perspective view of a tappet of an embodiment with two raised features that mimic two tappets.

In yet another alternative, instead of the raised features being solid shapes, other shapes can be used. For example, in the tappet 2200 shown in FIG. 19A, the two raised features 2210, 2220 on the plate 2205 are rings instead of solid circles/discs. As another example, in the tappet 2300 shown in FIG. 19B, the raised features 2310-2326 are arcs of rings instead of instead of continuous rings. Of course, there are merely examples, and other configurations can be used.

CONCLUSION

It should be understood that all of the embodiments provided in this Detailed Description are merely examples and other implementations can be used. For example, some features describing the interface between the tappet or tappet plate can be used in either a single tappet air disc brake or multiple tappet air disc brake. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein. Additionally, "in response to" can be directly in response to or indirectly in response to. Also, terms such as "generally, "substantially," or "about" can refer to a characteristic, parameter, or value that need not be exactly achieved, as deviations or variations (e.g., tolerances, measurement error, measurement accuracy limitations, etc.) may occur in amounts that do not preclude the effect the characteristic, parameter, or value was intended to provide.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. An air disc brake tappet comprising:
    a portion configured to couple the air disc brake tappet with a support member; and
    a plate coupled with the portion;
    wherein:
        the plate comprises a plurality of raised features that mimic a plurality of air disc brake tappets;
        the plurality of raised features comprise different heights:
        the plurality of raised features are positioned on the plate to contact at least one recessed feature of a brake pad backing plate; and
        depth(s) of the at least one recessed feature are unmatched with the different heights of the plurality of raised features.

2. The air disc brake tappet of claim 1, wherein the at least one feature of the brake pad backing plate comprises a plurality of features having a same shape as the plurality of raised features.

3. The air disc brake tappet of claim 1, wherein the at least one recessed feature of the brake pad backing plate has a different shape from the plurality of raised features.

4. The air disc brake tappet of claim 1, wherein the plurality of raised features comprise a same shape.

5. The air disc brake tappet of claim 1, wherein the plurality of raised features comprises different shapes.

6. The air disc brake tappet of claim 1, wherein at least one of the plurality of raised features comprises a solid shape.

7. The air disc brake tappet of claim 1, wherein at least one of the plurality of raised features comprises a portion of a solid shape.

8. An air disc brake pad assembly comprising:
    a friction material; and
    a backing plate coupled with the friction material;
    wherein:
        the backing plate comprises at least one recess shaped and positioned to receive a plurality of raised features of an air disc brake tappet;
        the plurality of raised features mimics a plurality of air disc brake tappets; and
        at least one of the plurality of raised features is tapered at an angle that is unmatched by an angle of the backing plate.

9. The air disc brake pad assembly of claim 8, wherein the at least one recess in the backing plate comprises a plurality of recesses, each having a same shape as the plurality of raised features.

10. The air disc brake pad assembly of claim 8, wherein the at least one recess in the backing plate has a different shape from the plurality of raised features.

11. The air disc brake pad assembly of claim 8, wherein the at least one recess in the backing plate comprises a plurality of recesses, each having a same depth.

12. The air disc brake pad assembly of claim 8, wherein the at least one recess in the backing plate comprises a plurality of recesses, each having a different depth.

13. The air disc brake pad assembly of claim 8, wherein the at least one recess in the backing plate comprises a plurality of recesses, each having a different shape.

14. The air disc brake pad assembly of claim 8, wherein the at least one recess in the backing plate comprises a plurality of recesses, each having a same shape.

15. An air disc brake system comprising:
    an air disc brake pad comprising:
        a friction material; and
        a backing plate coupled with the friction material, wherein the backing plate comprises at least one recess; and
    an air disc brake tappet comprising:
        a support member; and
        a plate coupled with t support member;
        wherein:
            the plate comprises a plurality of raised features that mimic a plurality of air disc brake tappets; and
            at least one of the plurality of raised features is either (i) tapered at an angle that is unmatched by an angle of the backing plate or (ii) has a different height with respect to another one of the plurality of raised features, such that the at least one of the plurality of raised features contacts the backing plate before the another one of the plurality of raised features contacts the backing plate, which tilts the backing plate to provide anti-wear protection for the friction material.

16. The air disc brake system of claim 15, wherein the at least one of the plurality of raised features has a different height with respect to another one of the plurality of raised features.

17. The air disc brake system of claim 15, wherein the at least one of the plurality of raised features is tapered at an angle that is unmatched by an angle of the backing plate.

* * * * *